(12) United States Patent
Flanagan et al.

(10) Patent No.: US 11,162,349 B2
(45) Date of Patent: Nov. 2, 2021

(54) SYSTEMS AND METHODS FOR GEOSTEERING DURING WELL DRILLING

(71) Applicant: Ubiterra Corporation, Denver, CO (US)

(72) Inventors: Peter W. Flanagan, Denver, CO (US); Thomas C. Daffin, Littleton, CO (US)

(73) Assignee: Ubiterra Corporation, Denver, CO (US)

( * ) Notice: Subject to any disclaimer, the term of this patent is extended or adjusted under 35 U.S.C. 154(b) by 227 days.

(21) Appl. No.: 16/429,913

(22) Filed: Jun. 3, 2019

(65) Prior Publication Data

US 2020/0109618 A1    Apr. 9, 2020

Related U.S. Application Data

(60) Provisional application No. 62/742,150, filed on Oct. 5, 2018.

(51) Int. Cl.
*E21B 44/02* (2006.01)
*G01V 11/00* (2006.01)
*E21B 49/00* (2006.01)
*E21B 7/04* (2006.01)

(52) U.S. Cl.
CPC ............... *E21B 44/02* (2013.01); *E21B 7/04* (2013.01); *E21B 49/00* (2013.01); *G01V 11/002* (2013.01)

(58) Field of Classification Search
CPC ............ E21B 44/02; E21B 49/00; E21B 7/04; G01V 11/002
See application file for complete search history.

(56) References Cited

U.S. PATENT DOCUMENTS

2019/0128067 A1\* 5/2019 Viens ................... E21B 41/00
2019/0361146 A1\* 11/2019 Roth .................... G01V 99/005

\* cited by examiner

*Primary Examiner* — Manuel A Rivera Vargas
(74) *Attorney, Agent, or Firm* — Polsinelli PC; Gregory P. Durbin

(57) ABSTRACT

Systems and methods for conducting drilling operations, including geosteering operations, include generating, at a computing device of a drilling management system, a visualization of a vertical well section for a geological formation from drilling data of a target well and reference data for the geological formation. The computing device generates the visualization by correlating the drilling data and reference data and calculating probabilities that locations along the target well are located at different offsets relative to the reference point. The computing device further varies a visual property at the offsets based on the probabilities such that the visualization simultaneously indicates the probabilities for each the locations. The visualization may then be provided to users for implementing geosteering operations. The probabilities may also be used by the drilling management system to automatically conduct geosteering operations.

24 Claims, 13 Drawing Sheets

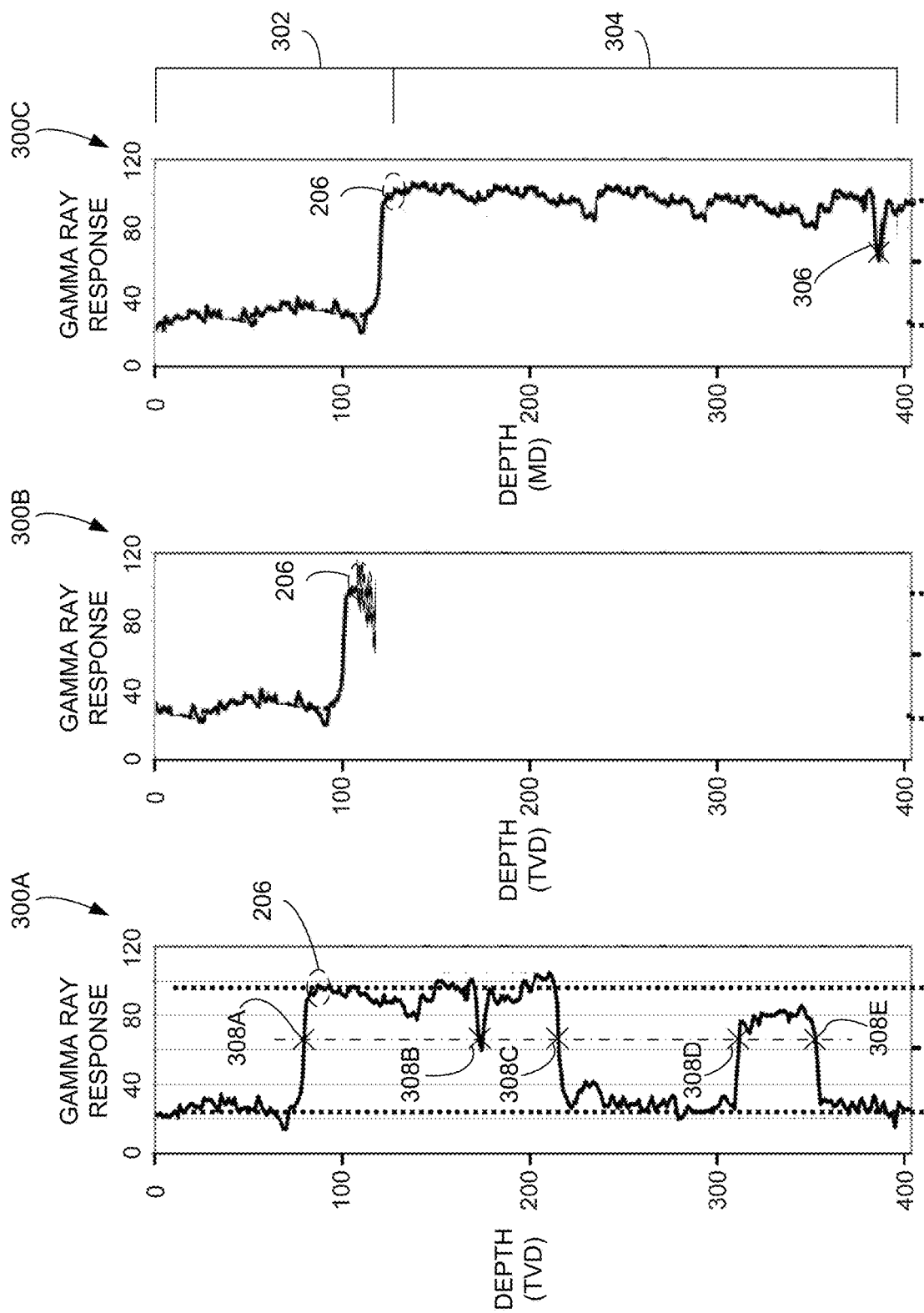

SYSTEMS AND METHODS FOR GEOSTEERING DURING WELL DRILLING

CROSS-REFERENCE TO RELATED APPLICATIONS

The present application claims priority under 35 U.S.C. § 119(e) to provisional application Ser. No. 62/742,150 titled "Systems and Methods for Geosteering During Well Drilling," filed on Oct. 5, 2018, which is incorporated by reference herein.

TECHNICAL FIELD

The present disclosure relates to geosteering and similar techniques for drilling wellbores in geological formations and, in particular, to systems and methods for correlating and/or presenting data related to geological features within subterranean formations to improve geosteering.

BACKGROUND

Geosteering refers to active steering of a drill through a formation by controlling inclination and azimuth of the drill. The control of the drill and thus the placement of a wellbore within a subterranean formation is based on measurement of geological and geophysical characteristics of the formation, such as through gamma ray measurements of the formation obtained by a logging while drilling (LWD) tool. Such techniques are often used to identify when a wellbore has entered into a target zone of the formation (e.g., by identifying the appearance of measurements characteristic of the target zone in the LWD data) and, once in the target zone, the objective of geosteering is to maintain the wellbore therein.

Geosteering may be implemented in conjunction with other exploration techniques. For example, three-dimensional seismic (or similar geological) data may be used to provide an overview of a formation for use in identifying potential wellbore trajectories, and to define a well plan. However, due to the inherent limitations of three-dimensional seismic data collection and analysis, seismic data is often too imprecise to rely on alone and LWD or other similar data must be used to supplement, confirm, or correct with the seismic data on a scale commensurate with the size of many target zones.

Type wells are another technique used to facilitate geosteering. A type well generally refers to a previously drilled well in the vicinity of a target well during the formation of which LWD or similar data is collected. The type well log data is then used to facilitate characterization of the formation at the location of the target well. The type well log data may provide some information and insight regarding the formation at the location of the target well; however, because the type well is offset from the target well, the exact structure of the formation at the type well may be different from that at the target well and the type well log data and LWD or similar data collected during drilling of the target well often deviate. Accordingly, careful analysis and correlation of the type well log data and LWD log data is often required for successful geosteering operations.

It is with these observations in mind, among others, that aspects of the present disclosure were conceived.

SUMMARY

In one aspect of the present disclosure, A method of conducting drilling operations is provided. The method includes generating, at a computing device of a drilling management system, a visualization of a vertical well section for a geological formation from drilling data of a target well within the geological formation and reference data for the geological formation. The computing device generates the visualization by correlating the drilling data and reference data about a reference point and, for one or more target well locations along the target well and using the drilling data and reference data, calculating probabilities that the location along the target well is located at different offsets relative to the reference point. The computing device further varies a visual property at the offsets based on the probabilities such that the visualization simultaneously indicates the probabilities for each of the one or more locations. In certain implementations, the drilling data may be received at the computing device from a logging while drilling (LWD) assembly of a drill string and the reference data may include well log data from a previously drilled well.

In yet another implementation, the method further includes generating, at the computing device, a data set for generating the visualization from the reference data and the drilling data. In such implementations, the reference data includes formation points corresponding to locations within the geological formation and respective reference data values for a formation property at each of the formation points and the drilling data includes drilling data values for the formation property at each of the target well locations. Also in such implementations, the data set includes, for each of the target well locations and for each offset from the reference point, a data set value representing the probability that the target well location is located at the offset, the data set value calculated from the drilling data value at the target well point and the reference data value at the offset.

In another aspect of the present disclosure, a method for geosteering during a drilling operation is provided. The method includes, generating, at a computing device of a drilling management system, a data set from reference data for a geological formation and drilling data for a target well within the geological formation. Generating the data set includes, at the computing device, correlating the drilling data and reference data about a reference point and for one or more target well locations along the target well and using the drilling data and reference data, calculating probabilities that the location along the target well is located at different offsets relative to the reference point. Subsequently and based on the data set, the drilling management system automatically modifies one or more parameters of a drilling operation to maintain a drill bit at a target offset relative to the reference point.

In yet another aspect of the present disclosure a system for facilitating geosteering during a drilling operation is provided. The system includes a computing system including one or more processors and memory. The memory includes instructions that, when executed by the one or more processors, cause the one or more processors to obtain each of reference data for a geological formation and drilling data for a target well within the geological formation and generate a visualization of a vertical well section for the geological formation from the drilling data and the reference data. The instructions cause the one or more processors to generate the visualization by correlating the drilling data and reference data about a reference point and, for one or more target well locations along the target well and using the drilling data and reference data, calculating probabilities that the location along the target well is located at different offsets relative to the reference point. The instructions further cause the one or more processors to generate the visualization by varying a visual property at the offsets based on the probabilities such that the visualization simultaneously indicates the probabilities for each of the one or more locations.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 3A-3C are graphs of example log data;

DETAILED DESCRIPTION

Figure 1A:
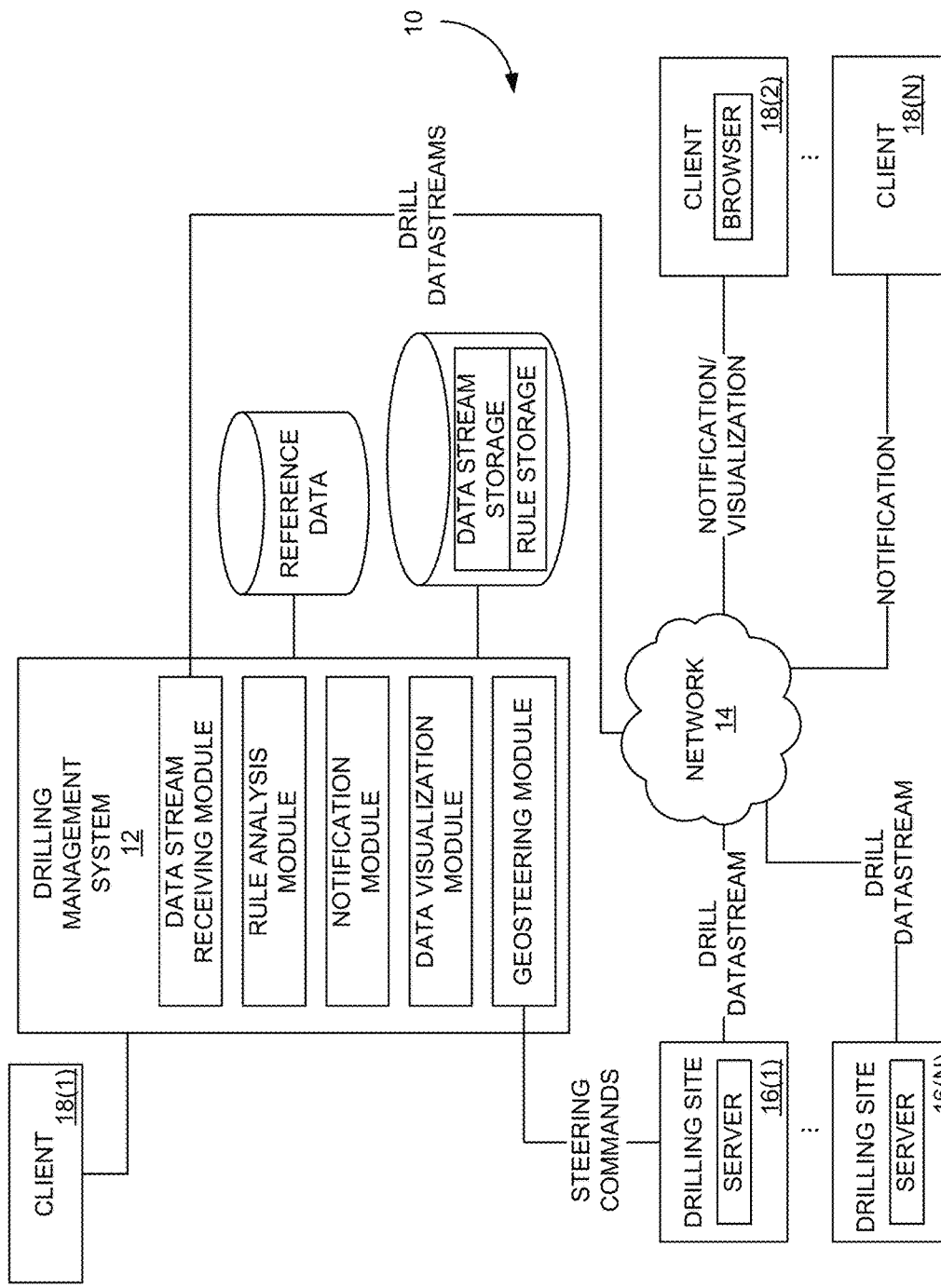
FIG. 1A is a schematic illustration of a system for automated geosteering of drilling systems.

Aspects of the present disclosure include systems and methods for correlating drilling and reference data to facilitate geosteering during drilling of a wellbore through a subterranean formation. In certain implementations, the drilling and reference data may include various well logs that are analyzed to generate matrices or similar data structures and visualizations of such matrices for presentation through a geosteering interface. The system may then, through unique real-time computer generated graphical visualizations, identify geological features, such as a top of a target zone or other features of a target zone, within the subterranean formation to inform decisions regarding drilling operations. Geosteering refers generally to techniques for altering the trajectory of a drill bit while drilling, in order to place the drill bit and corresponding wellbore being drilled through target zones. In the present case, the term geosteering refers to such techniques taking advantage of the systems set out herein.

Although other implementations are disclosed herein, in one specific example, the system may generate heat map-like visualizations of a well vertical section for display on a computing device where the colors of the visualization indicate the probability of particular features being at locations within the well vertical section. The visualizations and underlying data (or "matrices") may then be used for various purposes, including geosteering during a drilling operation, particularly in implementations in which the visualization and underlying data are continuously obtained and generated, such that they are updated substantially in real time. Use of the data for geosteering purposes may include presenting the data to a user and receiving commands or instructions from the user to modify various aspects of a drilling operation. In other implementations, the data may be collected and analyzed by a system configured to generate alerts, alarms, or other messages and to transmit such messages to personnel associated with drilling operations. Such messages may include, among other things, notifications or similar prompts indicating deviations from a well plan or recommendations regarding geosteering parameters. In certain implementations, the matrices may be used as input for an automated geosteering system to automatically control drilling operations based on the values of the matrices.

Drilling assemblies for oil and gas wells generally include a drill bit for forming a wellbore and may further include one or more sensors that may be used during drilling to obtain, process, and/or record information about the drill bit and the rock through which the drill bit travels. Data obtained during a drilling operation may be compared to previously collected information for the same formation (such as previously collected gamma ray or similar data obtained from previously drilled wells in the area) to establish or confirm features of the formation and locations of the same, such as the structural position of a target zone. So, for example, previously obtained gamma ray response data along a depth of a type well may be compared to similar gamma ray response data collected during drilling of a target well. Gamma ray logging, which is a specific type of wireline logging or logging while drilling, generally refers to a method of gathering gamma radiation data while drilling a wellbore. Different rock types and shales emit different and unique gamma radiation levels and hence such information is useful in characterizing geological formations. Wireline logging and logging while drilling may also include collecting other data, such as resistivity data, during drilling of a wellbore. Some conventional geosteering techniques involve correlating such data sets to estimate a location of the drill bit relative to various features within the formation, such as a top of the target zone. Drilling personnel may then use such estimates to steer or otherwise dictate subsequent drilling operations.

A significant problem with this conventional technique is that a given value of a formation property obtained during drilling of a target well may yield multiple potential matches in the reference data. For example, a particular gamma ray response value or pattern of gamma ray response values may appear at multiple locations/depths in the reference data and, as a result, may not be easily resolvable to a particular depth and location of current gamma ray response data (or other data obtained during drilling indicating properties of the surrounding rock). As a result, operators are generally required to carefully examine and compare the target well data to the reference data and to use their best judgment as to which of the potential depths the target well corresponds. Accordingly, one aspect of the present disclosure is a system and method whereby one or more visualizations are generated, each of which simultaneously shows multiple possible estimates for features within a given formation based on correlating target well data with reference data. The system generates such graphical visualizations in near real-time, and presents such visualizations in a graphical user interface with functionality that allows a user to readily identify and mark the most likely location for a given feature. The system may further generate such visualizations on a scrolling, real-time basis providing a mechanism whereby the visualization provides a unique graphical way by which a user may, among other things, adjust, confirm, add, or remove markings to facilitate rapid geosteering decision making. By way of such visualizations, the efficiency, accuracy, and timeliness with which potentially critical drilling operation decisions are made can be significantly improved over conventional techniques.

Although not limited to horizontal drilling applications, the systems and methods described herein are particularly useful in such applications due to the need to maintain drilling within a relatively restrictive target zone. For example, when drilling horizontal wells in so-called "resource plays", the lateral (also referred to as "horizontal") portion of the well will often be required to be drilled into and stay within a thin geologic sub-formation. For perspective, it is not uncommon for a target zone to be thousands of feet below the surface (e.g., 2 miles) and of approximately 15-25 feet in thickness. The drill bit often needs to stay within this tight tolerance for thousands of lateral feet (e.g., 10,000 feet or more) as the drill bit progresses through the lateral portion of the well bore.

To prepare for this activity, energy exploration companies will often prepare a drilling plan that is based on a detailed subsurface topological map including the top of the target zone. Often, such subsurface maps are based on a dense three-dimensional seismic survey that is calibrated to a well top (i.e., subsurface depth control points of known geologic formations) from existing nearby oil and gas wells. However, the precision of such maps can be limited at typical target well depths. For example, wells may be several miles underground and three-dimensional seismic survey data is imprecise and may include errors at such depths that exceed +/−10 feet. The value of such data, therefore, is limited when attempting to maintain a drill bit in a geologic zone that may be narrow. Moreover, the real-time measurements of the location of the drill bit obtained from sensors of the drilling assembly may also include errors. As a result, such real-time data is also imprecise and challenging to be reasonably relied upon for precise drilling operation control, such as may be required when steering through a target zone of a formation.

In the context of such imprecisions and challenges, conventional "geosteering" processes may be implemented to detect relative differences in depth between the drill bit and the target zone (or other geological feature of interest) based on comparing data sets including measurement data for a particular rock property (e.g., gamma ray response). Such data sets may include a first data set of target well data obtained during drilling of a target well and a second data set including reference data previously obtained during the drilling of wells in the vicinity of the target well. For example, the target well data may include logging-while-drilling (LWD) data obtained during drilling of the target well and the previously obtained values include similar LWD data (referred to herein as "type well data") obtained during drilling of a nearby wellbore. By correlating the target well LWD data against the type well data at a particular point of the wellbore, geoscientists or similar analysts may assess whether the drill bit is in, above, or below the target zone and determine the relative trajectory of the drill bit with respect to the target zone. Based on this analysis, a correction may be applied to drilling operation parameters to steer the drill bit such that the top of the target zone is located at a particular depth relative to the drill bit. The foregoing process may be repeated periodically along the lateral as drilling progresses in order to maintain a desired relationship between the drill bit and the top of the target formation.

A significant issue with conventional geosteering techniques is the potential for ambiguities in type well data when detecting particular geologic formations and correctly matching LWD data with the correct type well data. For example, type well data may include the same gamma ray response value and/or trend in gamma ray response values at multiple depths. Stated differently, in a vertical well bore through a geological formation varying stratigraphically (varying layers), some layers may produce gamma ray responses the same or similar to other layers, providing a type log of gamma ray responses that are the same or similar at different depths. Because of the ambiguities introduced by such similar values at varying depths, correlating such type well data with target well data may yield multiple possible results for the relative position of the drill bit to a geological feature of interest and, as a result, multiple possible corrections needed to maintain the drill bit at a desired offset relative to the geological feature. As a result, the geoscientist or individual responsible for geosteering decisions must generally rely on his or her expertise to choose the most likely correlation from the multiple possibilities. As part of this process, the geoscientist may try multiple correlations between the target well and type well data, including correlations at both the current position of the drill bit and at previous positions, to attempt to achieve a geologically reasonable interpretation of the correct position of the geological feature within the formation. This process is generally sequential, in that the geoscientist must try each particular correlation at discrete positions along the lateral. As a result, such conventional approaches are time consuming, prone to different interpretations, and difficult to accurately perform. It is thus possible for a geoscientist to incorrectly determine that the drill bit is currently located within the target zone when it is not and, as a result, maintain a drilling path that is outside of the target zone. Alternatively, it is also possible for geoscientists to determine that the drill bit is currently located outside of the target zone when it is in fact within the target zone and apply unnecessary corrections to the current drilling trajectory.

To address the foregoing issues, among others, aspects of the present disclosure involve systems and methods for computing and simultaneously displaying multiple possible graphical correlations between drilling data and reference data in an easily read, viewed, and intuitive format. For example, in one implementation, LWD data obtained during drilling of a target well and type well data are used to generate a matrix of values describing the probability that a given geological feature is at a particular location within a well vertical section. As described below in the context of FIG. 1, such data may be obtained from a LWD tool disposed on the drill string during drilling and may be transmitted uphole using various techniques, such as mud pulse telemetry. The LWD data may then be processed, transmitted, and stored for subsequent analysis. In one specific implementation, the LWD data is transmitted to and stored by a drilling management system, which may be in communication with multiple drilling sites and facilitate access to the LWD data and other drilling-related data by various client devices. Accordingly, in at least some implementations, the drilling management system may receive the LWD data and generate the matrix values.

Following their generation, the matrix values may then be displayed as a representation of the well vertical section with a superimposed color map (or similar visualization, which may be referred to herein as a "steering field") where different colors are used to indicate different probability values (also referred to herein as a "heat map"). In applications in which the visualization is used to indicate a top of a target zone, for example, potential locations of the top of the target zone may appear as colored bands extending across the visualization. As a result, the color map may simultaneously graphically illustrate multiple possible positions for a geological feature of interest, eliminating the need for an operator to sequentially test multiple locations to identify possible locations for the feature. The unique information computed as well as the presentation of the same, may be used to produce a faster and more accurate geosteering determination as compared to conventional techniques.

Visualizations generated in accordance with the present disclosure significantly simplify and speed the task of identifying the location of particular geological features within a formation and, as a result, determining any necessary corrections to apply during drilling operations. More specifically, the visualizations provide an intuitive and easily interpreted representation of the geological formation and the potential locations of features therein. By doing so, the degree of manual labor required to identify likely locations of features within a formation and the associated human error in making such determinations are significantly reduced as compared to conventional methods. Moreover, the accuracy with which features may be identified and corresponding drilling decisions may be made is significantly improved, allowing drilling operations to be conducted with greater precision. Further, such improved precision may enable operators to access target zones that would have otherwise been too difficult or risky to access using conventional geosteering techniques.

In certain implementations of the present disclosure, the visualization, associated LWD log, and type well log may be simultaneously displayed at a client device via a user interface. The user interface may further include various tools and features for, among other things, correlating the logs and identifying features in the visualization. For example, in one specific example, the user interface may allow a user to generate lines or similar indicators on the visualization to mark a location of a feature of interest. The user interface may also facilitate correlation of the type well log and LWD log in various ways. In one example implementation, the type well log and LWD log may be selectively coupled and decoupled such that, when decoupled, the LWD log may be shifted as a whole relative to the type well log.

In other implementations, the LWD log may be divided into one or more blocks. Each block may then be independently manipulated (e.g., by shifting, scaling, inverting, etc.) such that the portion of the LWD log has an improved fit with a corresponding portion of the type well log data.

Defining and manipulating blocks in this manner allows a user to achieve a better fit between the LWD log and type well log and to compensate for or otherwise accommodate for various sources of variance between the two logs. Moreover, in at least certain implementations, manipulation of blocks may be dynamically reflected in visualizations displayed through the user interface. For example, as previously noted, the user interface may allow a user to generate lines, points, or similar indicators corresponding to geological or other features within the formation. In such implementations, when a block of the LWD data is defined, the corresponding indicators may be associated with the block such that any manipulation of the block is reflected visually by the indicators. As a result, shifting, scaling, expanding, inverting, or any similar manipulation of the block may result in corresponding alterations to the indicators assigned to the block. By doing so, a user is provided with an intuitive and dynamic way of improving correlation between the LWD and type well data while receiving immediate feedback as to how changes in the correlation affect the location of features of interest and any impacts on geosteering operations that may follow.

Although the foregoing discussion focused primarily on improvements to facilitate geosteering processes involving a human operator, the systems and methods described herein may also be used to control and automate drilling operations. For example, the matrices describing the probable locations of geological features within a given formation may be used to automatically steer a drill bit during drilling operations or automatically generate steering suggestions.

As previously discussed, systems and methods in accordance with the present disclosure include collecting and comparing multiple data sets that may include drilling data from a target well being drilled and previously obtained reference data. The reference data may include data collected during one or more previous drilling operations. For example, the reference data may include data collected by LWD assemblies or similar equipment during the drilling of one or more wells or other wellbores (including producing wellbores) in the general vicinity of the target wellbore. In implementations in which the reference data is based on aggregated data from multiple wells, aggregation may include, among other things, averaging data collected from the multiple wells, weighting the data sets obtained from each well, or otherwise applying some mathematical operations to combine the data sets. For example, when multiple data sets obtained from multiple wells are used for the reference data, each data set may be assigned a weight based on the relative proximity of the respective well to the target wellbore being drilled.

The reference data may include, among other things, measurements of one or more formation properties at various locations within the formation. For example, and without limitation, data collected during drilling of a vertical type well may include gamma ray response values at various depths. In non-vertical wells, values of the reference data may be associated with either or both of a vertical depth and a horizontal displacement. Other properties and data that may be collected and associated with locations within the geological formation include, without limitation, one or more of density, photoelectric index, neutron porosity, resistivity, sonic response, nuclear magnetic resonance response, seismic-while-drilling response, and images captured from within the wellbore. It should be appreciated that while the current disclosure generally refers to comparing measurements of the drilling data to like measurements of the reference data (e.g., gamma ray response-to-gamma ray response), in certain implementations, different measurements may also be used provide they can be related in some way. The reference data may include the specific measurements of the formation property or may include mathematical transformations of the measured data. For example, in one implementation the reference data may include a rate of change of resistivity per unit of depth. As an alternative to or in addition to measurements of a formation property, the reference data may include a result of a mathematical function or transformation applied to one or more of such measurements. Portions of the reference data may also be marked or otherwise indicated as corresponding to particular features of the formation. For example, the reference data may include markers, tags, or similar indicators identifying particular layers, features, or zones within the formation.

Although the reference data is generally described herein as being obtained during previous drilling, the reference data is not necessarily limited to such data. For example, the reference data may also include or be derived from data obtained from other sources including, without limitation, seismic data and gravitational and magnetic data.

In implementations of the present disclosure, the reference data is generally compared and correlated with data that is collected during drilling of a target well. For example, such target well data may be collected in real-time or in near real-time using a LWD or similar assembly disposed at or near a distal end of a drill string (proximate the drill bit) implemented in drilling the target well. For example, the target well data may include locations of the drill bit along the wellbore and measurements of one or more properties of the formation at each location, the property corresponding to that of the reference data or those from which the reference data is derived.

Once collected, the reference data and the target well data may be compared to identify potential locations of the drill bit within the formation relative to geological features of interest within the formation, such as a top of a target zone. To do so, the target well data and the reference data are first normalized about a common point (referred to herein as the "anchor point") to account for, among other things, variations in surface elevation at the target well wellhead and the type well wellhead. For example, in certain implementations, the anchor point is selected as the location at which the target wellbore first reaches a top of a target zone. Once normalized about the anchor point, the target well data may be correlated and compared with the reference data to identify potential locations of a geological feature of interest with respect points along the wellbore. The foregoing process of correlating the data about the anchor point is sometimes referred to as "registration".

In one example implementation, the geological feature may be a top of a target zone and the anchor point may be the location at which a target well first enters the top of the target zone. An operator may subsequently seek to maintain a particular offset between the drill bit and the top of the target zone, for example, to maintain the drill bit within the target zone. During drilling, a gamma ray response may be measured using an LWD or similar tool at a particular location along the wellbore of the target well. The gamma ray response data from the target well may then be compared to gamma ray response data obtained from a nearby vertical type well, the gamma ray response data from the type well including gamma ray response values at various depths in the formation. As described below in further detail, the comparison may be used to generate a list of values indicative of the likelihood/probability that the top of the target zone is disposed at various offsets from the location of the target well data.

By repeating the foregoing comparison for multiple points along the target well, a matrix of the values indicating the location of the top of the target zone may be generated that corresponds to a region of the subterranean formation through which the target well is being drilled. As previously noted, the matrix may be used in certain implementations to generate a color map or similar visualization of the region of the subterranean formation that may be presented through a user interface for review and analysis by a user and, in particular, for the user to evaluate the various possible locations of the top of the target zone and identify the most likely of the possible locations. The user interface may be used to select points in the visualization corresponding to the likely location of the top of the target zone to draw a path through the formation corresponding to the top of the target zone. The user interface may also include functionality that automatically identifies at least some of such paths.

Instead of or in addition to presenting information to a user who may then make subsequent decisions regarding drilling operations, the values contained within the matrix may also be used to automatically control drilling operations. For example, systems in accordance with the present disclosure may analyze the values of the matrix to automatically identify the most likely location of the top of the target zone and automatically modify drilling parameters to maintain a predetermined offset relative to the target zone without requiring substantial operator intervention. Such drilling parameters may include, but are not limited to, a rotational speed of the drill bit, a drilling direction, a weight on bit, a rate of penetration, or any other parameter that may be modified to control drilling operations. In other implementations, the matrix may be used to automatically limit inclination changes within particular levels, project well paths, or supplement geological data (e.g., seismic data) obtained from other sources.

Example implementations of the present disclosure are now provided. The example implementations generally involve drilling of a horizontal target well during which gamma ray response data is collected from a LWD or similar assembly of the drill string used in the drilling. The gamma ray response data obtained during drilling of the target well is compared to gamma ray response data from a nearby type well to calculate the likelihood that an upper limit of a target zone is at a given depth. In examples provided, the comparison of the gamma ray data is used to generate and display a visualization of a well vertical section using a user interface, the visualization including a color map where the colors of the color map indicate the relative likelihood that the top of the target zone is at a given depth. The graphical representation is then presented to a technician, analyst, or other user such that the user can mark or otherwise identify the likeliest location of the top of the target zone. Based on the identified location of the top of the target zone, the user may then determine or provide instructions regarding subsequent drilling of the wellbore.

FIG. 1A illustrates an exemplary system 10 for automated geosteering of drilling systems. As illustrated, multiple computing devices can be connected to a communication network 14 and be configured to communicate with each other through use of the communication network 14. The communication network 14 can be any type of network, including a local area network ("LAN"), such as an intranet, a wide area network ("WAN"), such as the Internet, or any combination thereof. Further, the communication network 14 can be a public network, a private network, or a combination thereof. The communication network 14 can also be implemented using any number of communication links associated with one or more service providers, including one or more wired communication links, one or more wireless communication links, or any combination thereof, and may support the transmission of data formatted using any number of protocols, as well as different protocols as data traverses the various paths between devices. Moreover, it should be appreciated that the communication links may be of any suitable form and may include any suitable terrestrial or satellite-based communication systems.

A computing device, which may be involved in obtaining and transmitting drilling information, the drilling management system, and the client devices, can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing system 700 of FIG. 7.

To facilitate communication with other computing devices, a computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

As shown, the overall system 10 includes a drilling management system 12, drilling sites 16(1), 16(2), . . . , 16(N) (collectively "16"), and more particularly computing devices at the sites, and client devices 18(1), 18(2), . . . , 18(N) (collectively "18"). The drilling management system 12 can be comprised of one or more computing devices configured to monitor the traversed path of a drill bit throughout active drilling at any drilling sites 16, through receiving drilling information, and to communicate with various client devices 18. Among other things, the drilling management system 12 may be used to notify associated team members regarding the status of active drilling at the drilling sites 16 in real-time, to transmit collected data or information based on such data for review and analysis, and to generate and transmit control signals to various pieces of equipment (either directly or through intermediate computing or control systems). The drilling management system 12 may also facilitate access to or otherwise access and use other data sources including, without limitation, data from previous drilling operations and previously collected seismic or similar geological data.

Although the data collected and accessed by the drilling management system 12 may be used for various purposes, in at least some implementations of the present disclosure, the data may be used to facilitate geosteering operations. For example, in one application, the data collected by the drilling management system 12 may be used to generate visualizations or similar tools that are then presented to a user of a client device 18. The user may then use the client device 18 to review and analyze the presented data and make corresponding geosteering-related decisions, such as changing the current trajectory of the drill string. In other implementations, the data may be analyzed by the drilling management system 12 or a device in communication with the drilling management system 12 such that the geosteering-related decisions may be performed automatically.

The drilling sites 16 can be physical drilling sites equipped with drilling machinery, and accompanying sensors and computing devices, such as MWD and/or LWD components, configured to gather data describing the status of an active drilling operation and/or surrounding formation at a drilling site 16. For example, the drilling data, in the form of MWD data, may be delivered in the form of sets of Azimuth (bearing from North), Inclination (dip in degrees), and MD (measured length along wellbore). The data may be converted to X-, Y-, Z-axis values using any industry standard conversion. The conversion may occur prior to the drilling data being transmitted (e.g., the drilling stream) to the drilling management system. Hence, the drilling data can include coordinate data, such as an X-axis value, Y-axis value, and Z-axis value, describing the location of a drill bit as the drill traverses through the ground during the active drill. Drilling data can also include other sensor readings or data gathered during the active drill, such as sensor readings describing traversed soil densities, drill bit pressures, drill bit performance, etc. The drilling data may also include logging while drilling (LWD) data including gamma ray log information. The gamma ray log records the intensity of naturally ocucurring gamma radiation from rock.

Systems at the drilling sites 16 can gather and transmit this drilling data to drilling management system 12 as part of a drilling data stream. For example, drilling sites 16 can gather and transmit drilling data to drilling management system 12 every 10 seconds, 30 second, 1 minute, 5 minutes, etc. In one specific example, MWD and/or LWD data is collected by a corresponding tool associated with the drill string and typically positioned behind the drill bit. The tool transmits the data to the surface using "mud pulses"—digital pulses sent through drilling fluid, in the wellbore, to the surface where the pulses are encoded with positional data as well as other information. A transducer at the surface converts these pulses back into digital information on a network on the drilling rig. The data may be then be translated to the corresponding values (e.g., X-, Y-, Z-values for MWD tools, gamma ray readings for LWD tools, etc.) at a local computing device and transmitted, such as from a private web server at the drilling site, to the drilling management system. In certain implementations, such data is transmitted using the Wellsite Information Transfer Standard Markup Language (WITSML) protocol. To facilitate collection, storage, and transmission of drilling data, each drilling site 16 may include an electronic drilling recorder (EDR) or similar system.

In addition to coordinate data describing the location of a drill bit, drilling data can also include additional data describing an active drill. For example, the drilling data can include identifying data, such as a unique identifier identifying the originating drilling site 16, identifiers of equipment used for drilling, such as the drill bit, sensors, computing devices, etc. The drilling data can also include time stamp values indicating the time at which coordinate values for an active drill were recorded.

The drilling management system 12 can receive drilling data streams from one or more of the drilling sites 16 and analyze the drilling data to, among other things, conduct or modify geosteering operations, notify team members regarding the status of the active drill, update stored data of the drilling management system 12, and update visualizations of such data. For example, in response to receiving a drilling data stream, the drilling management system 12 may update a visualization displayed on a client device 16 illustrating, among other things, the trajectory of the well and the location of various features of the surrounding formation. The drilling management system 12 may then receive instructions from the client device 16 (or another client device) to steer the drill bit.

The drilling management system 12 may also generate, access, or update a depth model for the area being drilled at each drilling site 16. The depth model may identify the target wellbore trajectory for the drilling site 16, coordinates of known geo-hazards, target horizons, and other features. Generally speaking, the depth model may be derived from seismic data of the area to be drilled at the drilling site. Typically, seismic interpretation programs are used to digitize X-, Y-, and Z-coordinate data for a set of seismic data. The digitized coordinates may further represent and constitute 3-dimensional surfaces associated with the seismic data. Likewise, features identified within the seismic data may be digitized into unique three dimensional surfaces to form part of the depth model. For example, geologic faults, hazards, target horizons or boundaries and the like may be digitized into three dimensional surfaces representative of the respective features. Each data type (the seismic data and the derived horizon and fault surfaces) and the well data (the MWD and LWD information) has its own elevation datum. To align the various data sets used for comparison purposes and to trigger notifications, and the like, the elevation datum may be reconciled if necessary. For example, if the seismic data has a datum elevation of 5200 feet above sea level, and the drilling data has a datum elevation of 5250 feet above sea level, the depths between the two sets of data can be reconciled by adding 50 feet to the seismic data. The depth model may be based on seismic data for the area being drilled, and may be arranged in a cube with x (e.g., inline), y (e.g., crossline) and/or z (e.g., time or depth) aspects of the cube.

The drilling management system 12 can also maintain a set of rules for each drilling site 16. In certain implementations, the rules can identify events or milestones that, when met, trigger various actions by the drilling management system 12. For example, the rules can identify threshold distances from the target wellbore trajectory, the target horizons, and/or geological features that, when met or exceeded, cause the drilling management system 12 to undertake various geosteering operations, transmit a report to a specified team member or members. The drilling management system 12 can use the drilling data received from a drilling site 16, along with the corresponding depth model and set of rules, to determine when a rule has been triggered and team members should be notified regarding the status of the active drilling operation, or take any other suitable action.

As previously noted, the drilling management system 12 can exchange data with various client devices 18. Client devices 18 can be any type of computing devices, such as smart phones, laptop computers, desktop computers, tablets, etc. The drilling management system 12 can maintain records of client devices 18 associated with team members, including contact information to reach team members via one or more of client devices 18. In response to determining that a team member should be notified, drilling management system 12 can identify the team members contact information and transmit a notification to the user, which can be received by the user at one or more of client devices 18. For example, drilling management system 12 can transmit the notification as an e-mail, text message, phone call, instant message, etc.

The drilling management system 12 can also provide team members with various visualizations of an active drill. For example, drilling management system 12 may use techniques such as those described in U.S. Pat. No. 9,182,913, titled "Apparatus, System an Method for the Efficient Storage and Retrieval of 3-Dimesionally Organized Data in Cloud Based Computing Architectures," which is hereby incorporated by reference, to, among other things, store, access, and view three-dimensional seismic data and depth models within a cloud architecture utilizing a web browser or other client side application. The method disclosed in the '913 patent also provides for the efficient access to the depth model over network connections. Additional aspects of the system 10 in the context of providing automated notifications to team members is further provided in U.S. patent application Ser. No. 15/343,007, titled "Automated Geo-Target and Geo-Hazard Notifications for Drilling Systems", which is also incorporated herein by reference.

In certain implementations of the present disclosure, team members can use client devices 18 to communicate with drilling management system 12 to request a visualization of an active drill. In response, drilling management system 12 can transmit visualization data to the team member's client device 18. The visualization data can be rendered by client device 18, for example in a web browser or other client-side application, to present the user with a visualization of an active drill. This can include a 2- or 3-dimensional rendering of the drilling site including a visual representation of the traversed path of the drill bit, the target wellbore trajectory, target horizon, and features of the formation, such as a pre-existing wellbores, unpierced fault planes, lease boundaries, geological features, etc. As described in further detail in the remainder of this disclosure, such visualizations may be used to facilitate geosteering, including by facilitating correlation of type well and LWD data to identify particular geological features within a formation, to determine the relative position of the drill bit to such features, and to determine any course corrections necessary to maintain the drill bit within a particular range of the feature.

Figure 1B:
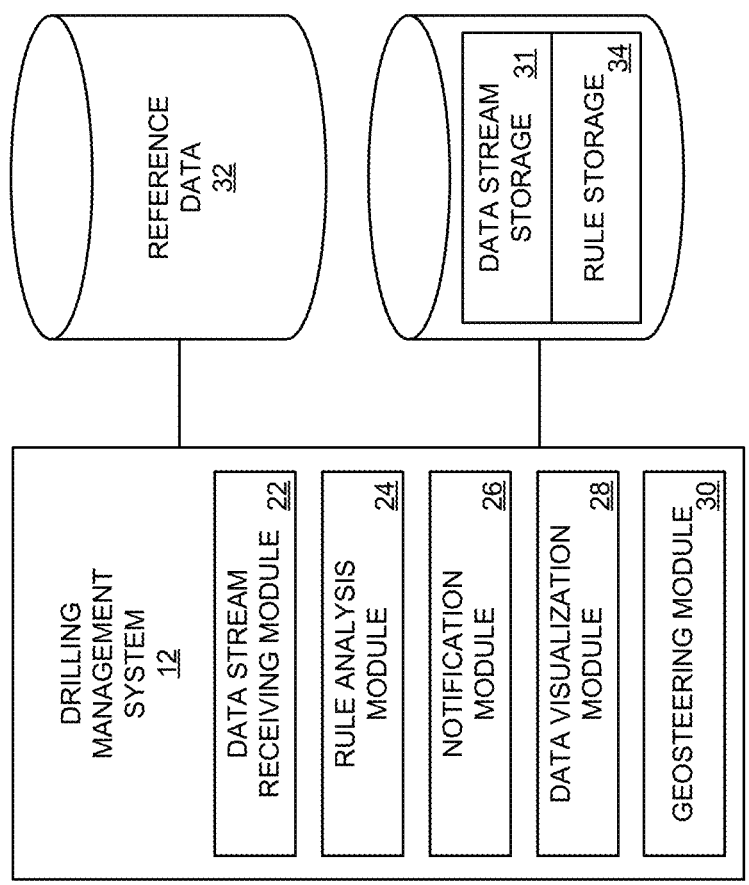
FIG. 1B is a schematic illustration of an embodiment of a drilling management system for use in geosteering.

FIG. 1B illustrates a drilling management system 12 as may be used in implementations of the present disclosure. FIG. 1B is described in view of the system and components described in FIG. 1A. As shown, the drilling management system 12 includes a data stream receiving module 22, a rule analysis module 24, a notification module 26, a data visualization module 28, a geosteering module 30, a data stream storage 31, a reference data storage 32, and a rules storage 34. The various modules may involve a processor (or processors) and computer executable instructions to receive the data stream, apply one or more rules to the data stream, and provide notifications as needed. The storage may be provided by one or more tangible readable media, provided as a database or databases, where data from the data stream is stored, the reference data is stored, and rules are stored.

The data stream receiving module 22 receives drilling data streams from one or more drilling sites 16. A drilling data stream can include drilling data describing an active drill including, without limitation, MWD data, LWD data (e.g., gamma response data), or data collected from any sensors associated with a drilling operation. In one possible example, the data stream is accessed from a server or other computing device at the respective well and may be formatted according to the WITSML protocol. The data stream may be received at the drilling management system 12 and/or the data stream storage 31 over the network 14. The data stream receiving module 22 can receive and store the received drilling data in the data stream storage 31, which may include a data stream index for one or more of the drilling sites 16. The drilling index can be a data index, data file, database, data table, etc., that includes a listing of drilling data received from a particular drilling site 16. For example, a drilling index can include a listing of coordinate data describing the location of a drill bit at the drilling site 16, as well as time stamp data, identifying data, sensor readings, etc. As a drilling operation proceeds, the data stream provides updated data as to the progress of the drilling operation and the current location of the drill bit. Accordingly, the drilling index for a drilling site 16 can include data documenting the traversed path of the drill bit at the drilling site 16, as well as other sensor data and metadata describing drilling at the drilling site 16.

Each drilling index can be associated with a unique identifier identifying the corresponding originating drilling site 16. The data stream receiving module 22 can identify the unique identifier included in a received drilling data stream to identify the corresponding drilling index in data stream storage 31 and record the received drilling data in the identified drilling index.

The rule analysis module 24 is configured to analyze received drilling data for various purposes. For example, in one implementation, the rule analysis module 24 may include rules for determining whether to modify current drilling parameters to change a wellbore trajectory. In another implementation, the rule analysis module 24 may determine whether to generate and transmit notifications to team members regarding the status of an active drill, including whether steering of the drill string is recommended to maintain the wellbore at a position relative to a particular geological feature. To do so, the rule analysis module 24 accesses the drilling data maintained in the data stream storage 31, reference data 32, and/or other similar data related to the formation or drilling operations, and evaluates the data according to various rules (e.g., as stored in a rule storage 34). The rules implemented by the rule analysis module 24 may include predefined or user-defined rules, the latter of which may be created, modified, or selectively applied by a user or administrator of the drilling management system 12. Rules may also be grouped into rule sets corresponding to particular geographic regions, formations, formation types, or any other similar characteristic. Moreover, rules may be selectively assigned to individual wells, groups of wells (e.g., wells in a similar geographic area or formation), portions of drilling operation, and the like.

The reference data storage 32 stores reference data for use during drilling operations and, in particular, for use in geosteering operations. The reference data contained in the reference data storage 32 may include, among other things and without limitation, depth models, seismic data, or any other similar data associated with a formation, type or formation, type of well, etc. In one specific implementation, the reference data storage 32 includes log data obtained from one or more type wells in a formation within which an active/target well is being drilled. As described below in further detail, such type well data may include gamma ray response data (or similar formation property data) to which LWD or similar drilling data for the active/target is correlated. The correlated type well and LWD data may then be used to generate a matrix of values indicating the likelihood of the location of the active/target well within the formation.

In certain implementations, each drilling site 16 may be associated with a depth model (or similar formation data) and set of rules. The rule analysis module 24 may then utilize the unique identifier for a drilling site 16 to gather the corresponding drilling index, depth model, and set of rules from data stream storage 30, reference data storage 32, and rule storage 34, respectively. The rule analysis module 24 can then use the gathered data to determine whether a rule has been triggered. In at least certain implementations, the rule analysis module 24 can determine whether a rule has been triggered according to a predetermined temporal schedule, such as every 5 seconds, 10 seconds, 1 minute, etc. The rule analysis module 24 can also determine whether a rule has been triggered as updated coordinate data (e.g., relative drill bit location data) is received from a drilling site 16 as part of a drilling data stream.

The set of rules for a drilling site 16 can include any number or type of rules and/or conditions. For example, a set of rules may include a simple temporal milestone rule dictating that an update regarding the trajectory of the wellbore relative to a geological feature of interest be generated and transmitted to team members at specified time intervals, such as every 30 seconds, 1 minute, 5 minutes, etc., or according to a specified time schedule. In one example, a user interface may be accessed through a client service log, where the user interface provides access to a set of preconfigured rules. The user interface may include fields to activate any given rule or to set variables for any given rule. For example, the frequency with which updates are provided may be a variable set through the user interface. In the event one or more of such periodic rules are implemented, the rule analysis module 24 may monitor elapsed time during an active drill for each specified temporal milestone.

As another example, a set of rules can include a distance based milestone rule dictating that team members be notified as the drill bit reaches predetermined distance intervals (a variable settable through the UI), such as every 10 feet, 20 feet, 100 feet etc., or according to a specified distance schedule. The rule analysis module 24 can utilize the location data stored in the drilling index to determine the current location of a drill bit as well as the distance traversed by the drill bit during the active drill and determine whether the rule has been triggered.

As another example, a set of rules can include a trajectory deviation rule dictating that team members be notified when the current location of the drill bit deviates beyond a predetermined threshold distance from the target wellbore trajectory, the target horizon for the drill bit, and/or a geological feature identified within the formation (e.g., a top of formation). Rule analysis module 24 can utilize the location data stored in the drilling index to determine the current location of a drill bit and utilize the depth model to determine the target wellbore trajectory and/or the target horizon. Rule analysis module 24 can then determine the distance between the current location of the drill bit and the target wellbore trajectory, target horizon, and/or feature of interest and compare the distance to a threshold distance to determine whether the rule has been triggered.

With respect to this comparison the actual drill bit location to the drilling plan, a distance is computed between a point in three-dimensional space (e.g., the (x, y, z) coordinate for the current location of the drill bit) and the drilling plan, which may be represented by a polyline in three dimensional space (series of points through the three-dimensional space of a depth model). The distance may be resolved into a z-component and an xy-component that is projected onto the well plan vertical plan, which may be defined in the depth model or separate therefrom. In that regard, the system can determine the location of the drill bit relative to plan and provide any suitable notification—e.g., "at 5:30 p.m., the drill bit is 15 feet above the drilling plan, and 10 feet north of the drilling plan".

As another example, a set of rules can include trajectory deviation rules dictating that team members be notified when an angle of the drill bit relative to the target horizon exceeds a threshold angle deviation from the target horizon. Rule analysis module 24 can utilize the location data stored in the drilling index to determine a direction (i.e., vector direction) of the drill bit and utilize access the target horizon from the depth model. Rule analysis module 24 can then determine an angle deviation of the drill bit from the target horizon and compare the angle deviation to the threshold angle deviation to determine whether the rule has been triggered.

As another example, a set of rules can include a minimum distance rule to a geo-hazard, such as a pre-existing wellbore, unpierced fault plane or lease boundary. Rule analysis module 24 can utilize the location data stored in the drilling index to determine the current location of a drill bit and utilize the depth model to determine the location of a geo-hazard. Rule analysis module 24 can then determine the distance between the current location of the drill bit and the geo-hazard and compare the distance to a threshold distance to determine whether the rule has been triggered. In this example, the computed (x, y, z,) position of the drill bit (current and the previous values, which trace out the actual wellbore path) are compared to the location of a fault surface. The fault surface is stored as a triangulated surface in the same (x, y, z) coordinate system as the coordinates of the path of the drill bit. Computational geometry is used to compute the distance between a point in three-dimensional space (e.g., the most recent position of the drill bit) and a surface in three-dimensional space along a direction vector (the direction that the drill bit is heading). The distance is expressed in standard distance units (meters). So, if a threshold distance has been set for proximity to fault surfaces (such as 50 meters, which may be a variable), when that distance is less than or equal to 50, a notification is generated.

With respect to the intersection of the drill bit with a geo-hazard of some sort, the planned wellbore (a polyline in three-dimensional space) indicates approximately where the wellbore is going to be, and the actual wellbore indicates the real-time (near real-time position) of the drill bit. In one example, any fault surface that intersects the planned wellbore may be considered a "geo-hazard". For any such fault surface, the system can compute the distance to the geo-hazard by computing the distance from the current drill bit position to the intersection of the planned wellbore with that fault surface. Furthermore, the system can estimate the time of the intersection occurring by dividing the distance by the current Rate of Penetration of the drilling (expressed by convention as Feet or Meters per Hour), which may be received by the system with the drilling information provided by the MWD system.

Rule analysis module 24 can determined the distance between the current location of the drill bit and another location based on geographic coordinates associated with the two points, such as an x coordinate value, y coordinate value and z coordinate value assigned to drill bit and the other point. In instances where an object is associated with multiple geographic coordinates, such as a target wellbore trajectory, lease boundary, pre-existing wellbore, etc., rule analysis module 24 can determine the shortest distance between the current location of the drill bit and the other location.

In another example, the rule analysis module may compare the current drill bit position to a target horizon or target horizons. The rule analysis module may also compare the drill bit to a range of distances from a target horizon, or may generate a virtual horizon and compare the location of the drill bit to the virtual horizon. In one example, the depth model may include at least one target horizon. The target horizon, may be a surface comprised of x, y, and z coordinate data. The target horizon may be associated with the top surface, bottom surface or some other surface associated with a formation identified in the seismic data cube from which the depth model is based. For example, a shale bearing formation may be identified in a seismic data set, and a target horizon may be generated and stored for a surface representing the top surface of the formation.

Continuing with the example of a shale formation and a horizon defining a surface in the depth model for the top of the formation, during drilling, it may be desired to drill a horizontal well within some distance from the top of the formation. Hence, a rule may be created to compare the current drill bit position with a target horizon, and generate some form of notification when the drill bit deviates some distance, defined in the rule, from the top of the formation. In another example, it is possible to define a second horizon, such as related to the bottom of the shale formation, and define a rule that provides a notification when the drill bit comes within some target distance of either the top or the bottom of the formation.

In yet another example, the system (e.g., the rule module) may generate a virtual horizon. In one example, the virtual horizon may be a surface defined as some set distance from another surface, such as a virtual horizon defined relative to a target horizon in the depth model. The rule may both generate the virtual horizon, and be defined to generate a notification based on the distance of the drill bit from the virtual horizon. In this example, the target horizon is a surface within the depth model, where the surface is based on some corresponding feature in the related seismic data, and the virtual surface is a surface that is generated based on some mathematical relationship to the target horizon. A virtual surface may be useful, for example, when the resolution of the seismic data is insufficient to identify sub features within a formation, but it is believed, based on perhaps other information, that it is useful to target or avoid the sub feature and a virtual surface is generated for the sub feature, and the rule then based on the sub feature.

The notification module 26 is configured to notify team members when a rule has been triggered. Rule analysis module 24 can provide to the notification module 26, when a rule has been triggered, the data identifying the triggered rule. In one example, the user interface may include a function for team member contact information is entered. The contact information may include a phone number for an SMS message, an email address, or other information for the form of communication. The team members and contact information may be linked to the drilling site, and whenever a rule is triggered for the drilling site, the team receives a message over the form (or forms) of communication entered in the site.

In response to receiving a notification from the rule analysis module 24 that a rule has been triggered, notification module 26 can identify a set of team members that should be notified. In some embodiments, each rule can identify the corresponding team members that should be notified when the rule has been triggered as well as include contact information for the identified team members, preferred contact method for the team members and/or data that should be provided to the team members. Notification module 26 can use the data in the triggered rule to generate and transmit notification messages to the team members. For example, notification module 24 can transmit the notification messages as text messages, instant messages, e-mails, etc.

Data visualization module 28 can be configured to provide team members with a visualization of an active drill. The visualization of the active drill can be a two- or three-dimensional rendering of the active drill at a drill site 16, including a visual representation of the traversed path of the drill bit, the target wellbore trajectory, target horizon, and geo-hazard, such as a pre-existing wellbores, unpierced fault planes, lease boundaries, etc.

Data visualization module 28 can receive data visualization requests from client devices 108 for a visualization of an active drill. A data visualization request can include data identifying a drilling site 16, such as the unique identifier for the drilling site 16. Data visualization module 28 can use the unique identifier included in the visualization request to identify and gather the corresponding drilling index in data stream storage 31 and depth module in depth model storage 32. Data visualization module 28 can use the gathered data to generate visualization data that can be rendered by client devices 18 to present the visualization of the active drill. Data visualization module 28 can provide the generated visualization data to the requesting client device 18, where it can be rendered for the team member. Data visualization module 28 can continue to provide updated visualization data to client device 18 to update the visualization of the active drill, thereby allowing the team member to view progress of the active drill in real-time.

In at least some implementations of the present disclosure, the data visualization module 28 may generate a visualization of a vertical section of a formation including a target well. As further described below, the visualization may further include a color, heat, or similar map overlaid onto the vertical section where the colors of the map (or other visual property of the map) indicate the probability of particular features being at locations within the vertical section.

Although described as being a part of the drilling management system 12, it should be appreciated that the data visualization module 28 may be executed, at least in part, as an app or program run on the client devices 18. For example, in one implementation, the data visualization module 28 includes a browser-based viewer or viewer software executed on a client device 18. During operation, the viewer receives data from the drilling management system 12 and renders the received data for viewing via the client device 18. The viewer may be part of a broader user interface that allows a user to configure how the data is rendered/presented, edit the data (e.g., by scaling, inverting, or shifting data), add markers or other identifiers to the visualization, or perform other similar tasks as described below in further detail.

Geosteering module 30 generates and transmits control or similar signals to equipment of one or more of the drilling sites 16 to control drilling operations and, more specifically, to control the trajectory of the drill string. For example, the geosteering module 30 may generate control signals that modify weight on bit, rate of penetration, drilling direction, or other similar parameters that may be used to control or change the path of a drill bit. In certain implementations, the geosteering module 30 is configured to automatically generate such control signals based on received drilling data for an active well (e.g., as stored in data stream store 31), reference data 32, output from the rule analysis module 24, or input received from a client device 18.

Figure 2A:
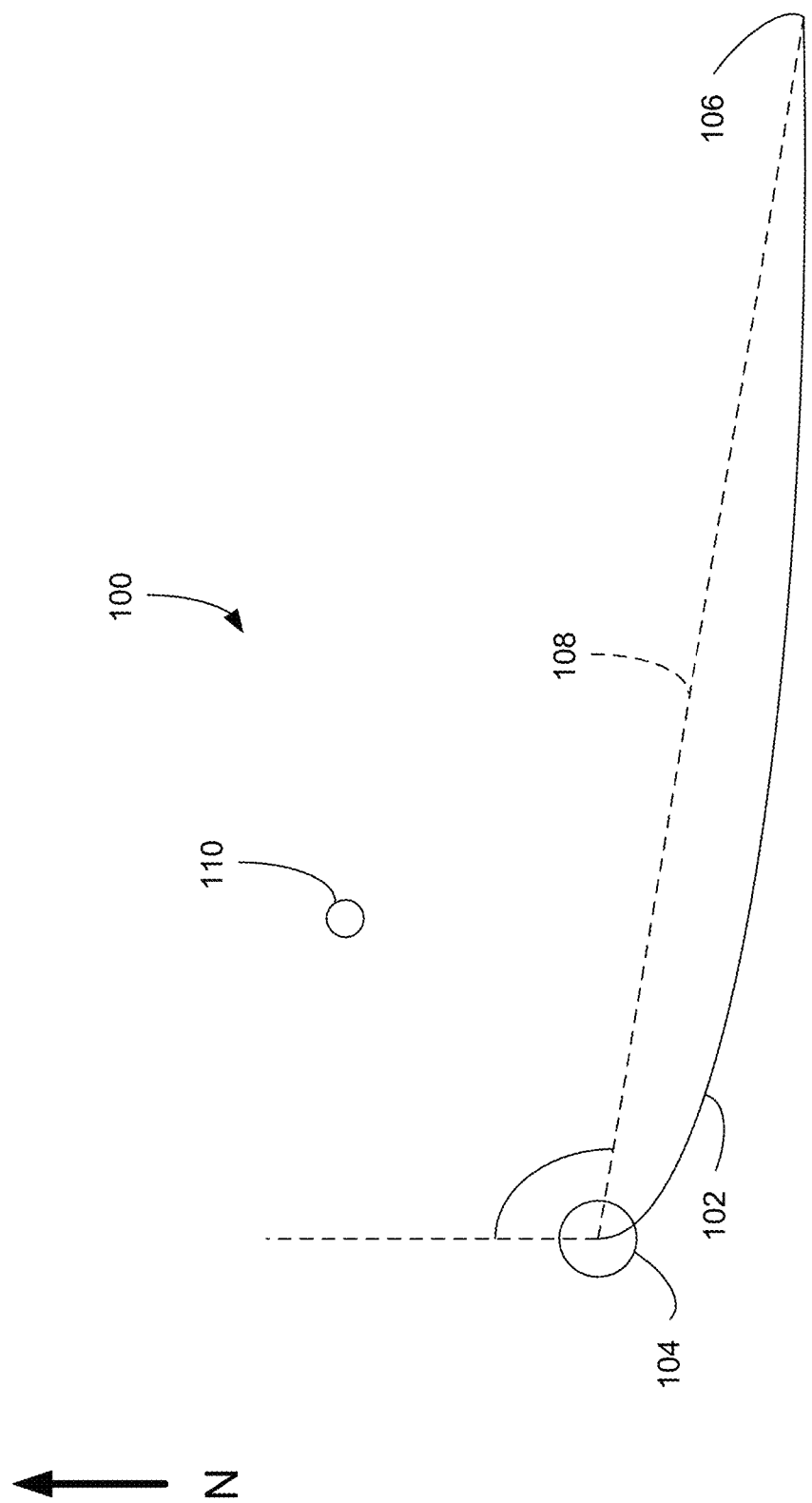
FIG. 2A is a map view of an example drilling environment including a target well extending through a subterranean geological formation.
Figure 2B:
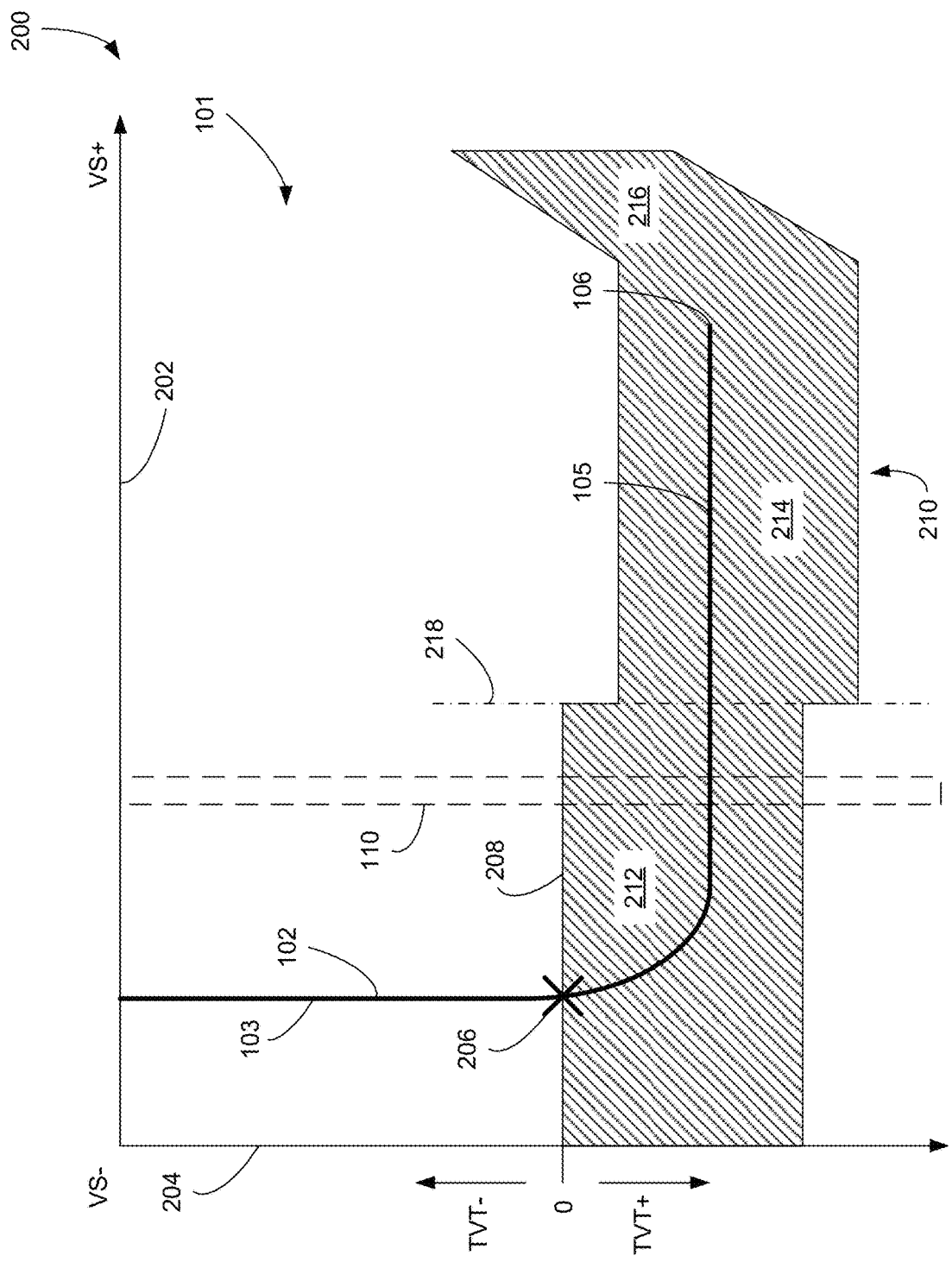
FIG. 2B is a cross-sectional view of the subterranean geological formation of FIG. 2A and including the target well.

FIG. 2A is a map view (e.g., a top-down view) of an example drilling environment 100 including a target well 102 extending through a subterranean geological formation 101 (shown in FIG. 2B). In general, during drilling operations, the target well 102 starts at a surface location 104 and is drilled down into the earth generally vertically and then generally horizontally until a toe 106 (the end of the horizontal section) is reached. The target well 102 may generally follow a curved path, however, for purposes of analyzing and monitoring drilling operations, the target well 102 may be projected onto an azimuth 108 of the target well 102 to generate a well vertical section, such as the well vertical section 200 illustrated in FIG. 2B. The example drilling environment 100 further includes a previously drilled vertical type well 110 (illustrated as a circular well head) that, in the specific example of FIG. 2A, is located northeast of the target well 102. For reference, the vertical type well 110 is also included in FIG. 2B as projected onto the azimuth 108. Reference in the following description is also made to FIG. 6, which is a flow diagram illustrating an example method 600 for performing drilling operations that may include geosteering.

The well vertical section 200 shown in FIG. 2B is a cross-sectional view of the subterranean geological formation 101 and includes the target well 102. As illustrated in FIG. 2B, the target well 102 may generally be considered to include a vertical section 103 that transitions to a lateral section 105. Although illustrated in FIG. 2B as being substantially straight, it should be appreciated that the vertical section 103 and the lateral section 105 may extend along paths that deviate and vary from strictly vertical and horizontal directions, respectively. Accordingly, the terms "vertical" and "lateral" as used to describe sections of the target well 102 are intended to more generally refer to a first section of the well for reaching depth and a second section that traverses at depth.

The horizontal axis 202 of the well vertical section 200 indicates a well section horizontal distance (VS) while the vertical axis 204 indicates depth. As illustrated in FIG. 2B, the vertical axis 204 may be measured in true vertical thickness (TVT) relative to an anchor point 206, where the anchor point 206 may be a top 208 of a target geologic zone 210 (or other reference point) used to correlate multiple data sets, as discussed below in further detail. As previously mentioned, the well vertical section 200 includes the type well 110 (shown in dashed lines). As discussed below, FIG. 2B further includes a fault line 218 (shown in a dash-dot line) indicating the location of a fault in the subterranean geological formation 101.

Referring to FIGS. 2A and 2B, during drilling operations, a drill bit and corresponding drill string is advanced through the geological formation 101 to form the target well 102. As the target well 102 is drilled, a LWD or similar sensor assembly may be used to collect and log measurements taken using one or more sensors of the LWD assembly. Such measurements may include one or more properties of the rock through which the target well 102 is drilled. For example, in one implementation, the drill string may include a LWD tool adapted to collect gamma ray response information, which is a reliable property for differentiating rock layers in shale and related resource play geologic formations.

In other implementations similar logging tools may be used to collect other property measurements instead of or in addition to the gamma ray response data. Such property measurements may include, without limitation, values corresponding to resistivity, sonic response, nuclear magnetic resonance response, or seismic-while-drilling response and images may also include images or other similar data captured from within the wellbore during drilling. For simplicity only and without limitation, the following discussion refers primarily to gamma ray response as the measured property used to correlate drilling and reference data. However, unless otherwise noted, any other suitable property may be used instead of gamma ray response in the following discussion.

Logging of the gamma ray response data obtained during drilling may include associating each of the measured values with one or more depth measurements. For example, such depth measurements may include a measured depth (MD), which corresponds to a length of the wellbore along the drilling independent of the wellbore's direction, and/or a true vertical depth (TVD), which corresponds to a depth relative to a wellhead or other surface feature and which may be computed using various industry standard techniques and algorithms.

As the gamma ray response values are logged during drilling of the target well 102, the logged data may be correlated and compared to previously obtained reference data that also includes gamma ray response measurements. For example, such reference data may include gamma ray response measurements obtained during drilling of the type well 110. Referring to the method 600 of FIG. 6, the steps of obtaining each of the reference data and the target well data, as described above, are included as operations 602 and 604, respectively.

As previously noted, an anchor point 206 within the geological formation may be identified that corresponds to a top 208 of the target zone 210. Because the location of the anchor point 206 may be identified in each of the drilling data and the reference data, the anchor point 206 may be used as a common frame of reference for both data sets. In other words, determining the offset of the anchor point 206 for each data set and shifting the data set by its respective offset allows each of the data sets to be normalized about the anchor point 206. The location of the anchor point 206 within each data set may be identified in various ways. For example, in cases where the anchor point 206 corresponds to a particular geological feature, such as the top 208 of the target zone 210, the anchor point 206 may be indicated within the respective data sets as a known or marked change in the data values corresponding to the change in formation zone.

The location of the anchor point 206 may be automatically identified by comparing the drilling data to the reference data. For example, the reference data may include one or more gamma ray response measurements corresponding to a geological feature of interest, such as a top of a target zone. During drilling, the drilling data may be compared to the reference data to determine whether the measurements of the drilling data reach a similar value, follow a similar trend, or otherwise have similarity to those of the reference data and, in particular, to those associated with the geological feature of interest. For example, as shown in FIGS. 3A-3C, there is a sharp increase (at 308A) in the type well log 300A at approximately 75 depth units. Such an increase may be selected or otherwise identified as indicating a top of a target zone (e.g., the top 208 of the target zone 210 shown in FIG. 2B; however it should be appreciated that in other applications, changes in the type well log may also indicate other geological features and a top of a target formation is provided merely as an example) such that during drilling, the system may monitor the target well log for a similar increase, which occurs at approximately 100 depth units in target well log 300B and 125 depth units in well log C. When such similarities are found in each of the reference and well data, the corresponding location in each data set may be considered the anchor point.

Identification of a similar increase in each data set is just one example feature of the data sets that may be used to determine the location of an anchor point. In other implementations, other metrics may be used including, without limitation, one or more of a high measurement, a low measurement, a rate of change of measurement per unit depth, multiple consecutive measurements above or below a threshold value for a predetermined distance, or any other suitable trend in the data set may be used to identify the anchor point.

Figure 6:
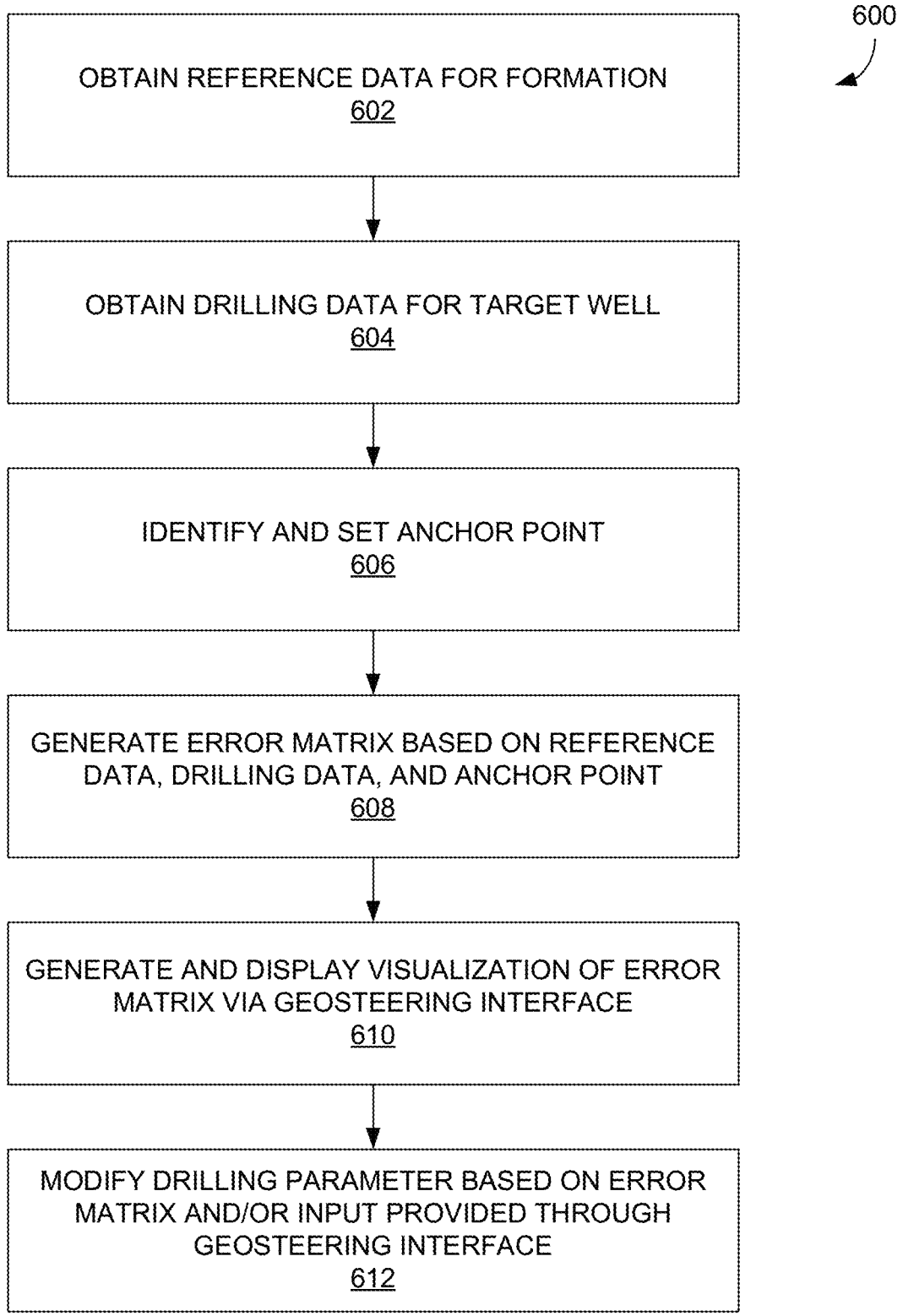
FIG. 6 is a flow chart illustrating an example method for performing drilling operations including geosteering.

The process of identifying and setting the anchor point 206 is included in the method 600 of FIG. 6 as operation 606. In light of the foregoing description, it should be appreciated that operation 606 may include, among other things, an automatic identification of the anchor point 206 or may include a user reviewing each of the reference data and the target well data through a geosteering or other user interface and providing to the interface a selection corresponding to the anchor point 206.

The designation of the anchor point 206 as being at the top 208 of the target zone 210 in FIG. 2B is intended merely as an example. More generally, the anchor point 206 corresponds to any point of the geological formation 101 that may be used to correlate the drilling and reference data. Accordingly, although discussed herein as being related to the top 208 of the target zone 210, in other implementations the anchor point 206 may correspond to other points or features within the geological formation 101 that are identifiable in each of the drilling and reference data sets. As a result, the anchor point 206 provides a common point that may be used to correlate data points of the LWD and type well log above and below the anchor point 206.

Referring back to FIG. 2B, after having penetrated the top 208 of the target zone 210, the drill bit may be steered to follow a drilling path of the target well 102 that extends in a lateral direction and through the target zone 210. As illustrated in FIG. 2B, the target zone 210 may include multiple sections, each of which may or may not extend in a substantially horizontal direction. For example, the target zone 210 includes a horizontal section 212 and an inclined section 216. Moreover, the target zone 210 may extend across faults (such as fault 218) or other discontinuities that result in sudden shifts in the depth of the target zone 210, such as fault portion 214. Accordingly, while the thickness of the zone may be known at least proximate the vertical section (e.g., from the previously reference data obtained when drilling the type well 110), the actual depth of the top 208 of the target zone 210 along length of the well 102, may not be precisely known. Because of the variability of the target zone 210, it can be problematic to assume that the target zone 210 simply extends in a horizontal band, is flat or of consistent depth, or otherwise follows an otherwise consistent trajectory through the geological formation 101. Therefore, the drilling depth measurements (e.g., the MD or TVD) of the drilling data are generally inadequate to maintain the drill bit at a predetermined offset relative to the top 208 of the target zone 210. To address this issue, systems and methods according to this disclosure correlate the drilling and reference data about the anchor point 206 such that possible locations for the top 208 of the target zone 210 may be readily identified despite the potential presence of faults or discontinuities.

FIGS. 3A-3C illustrate example log data that are referenced to in the following discussion to illustrate the concept of correlating the reference and drilling data. More specifically, FIG. 3A illustrates a reference gamma response log 300A, such as may be obtained from the type well 110 while FIGS. 3B and 3C illustrate two gamma ray response logs 300B, 300C obtained during drilling of target well, such as the target well 102. As illustrated, each of the logs 300A and 300B indicate gamma response value versus depth measured based on TVD while the log 300C illustrates gamma response versus depth measured based on MD. The anchor point 206 is indicated in each log 300A-300C.

As illustrated in the logs 300B and 300C, the target well is drilled to a TVD of approximately 110 depth units (approximately 125 depth units MD) before being steered into a substantially lateral direction. As a result, a significant amount of the gamma ray response data (along the lateral section generally about the same depth) in log 300B is clustered around approximately 110 depth units. In contrast, the log 300C represents gamma ray response versus MD (i.e., along the length (lateral) of the wellbore of the target well 102) and, as a result, does not include the clustering of the log 300B. Nevertheless, the log 300B may be generally thought of as being divided into a substantially vertical section 302 and a substantially horizontal section 304 (or include axes for (e.g., each of a vertical and a horizontal axis) for display), with the anchor point 206 serving as the delineation between the two sections. In other implementations, the log 300C may instead measure gamma response versus a lateral displacement (e.g., along the horizontal or Vs axis 202 indicated in FIG. 2B).

Notably, the anchor point 206 appears at different depths in each of the well logs 300A-300C for various reasons. For example, because TVD is measured relative to a well head or surface, a TVD offset may exist between the type well log 300A and the target well TVD log 300B due to differences in the elevations of their respective wellheads. Similarly, the anchor point 206 may be indicated at difference depths of the two target well logs 300B, 300C if the target well 102 is not precisely vertical. As a result, normalization of the gamma ray response about the anchor point 206 (or other predetermined feature) is generally needed to properly correlate and compare the logs as disclosed herein.

With reference to FIGS. 3A-3C, suppose the TVT of the drill bit (i.e., the offset of the drill bit relative to the anchor point 206) at a MD of approximately 375 depth units, as indicated by marker 306, is to be identified. To do so, the gamma ray response value at 375 depth units in log 300C may be compared to the gamma ray response values of the type well log 300A (or a modified log normalized about the anchor point 206) to identify depths having the same gamma ray response value. As indicated in 300A, for example, such a comparison would yield approximately five distinct depths (indicated by markers 308A-E) that most likely correspond to the TVD locations for the marker 306. Accordingly, the possible TVT depths of the drill bit at the location corresponding to the marker 306 may be determined by normalizing the values represented by the markers 308A-E about the anchor point 206.

The foregoing process may be summarized as follows. First, a point of interest along the target well is identified. Next, a property value (e.g., gamma ray response) at the point of interest is obtained. The property value is then compared with reference data including depths and corresponding property values at each depth. Doing so determines potential depths for the point of interest in the frame of reference of the reference data. The potential depths may then be normalized with respect to an anchor point or similar point of reference within the geological formation.

In certain implementations of the present disclosure, in addition to identifying potential depths at which a geological feature may be located, a vector of probability measurements corresponding to a range of depths may be generated for one or more points along the target well 102. For example, and as described below in more detail, in implementations in which the reference data includes 100 depth measurements, each having a respective gamma response value, a vector for a point along the target well 102 may include a value for each of the 100 depth measurements, with each value being a difference (or other mathematical relationship) between the gamma response value of the point of the target well 102 and the respective reference data extending from the point. As a result, each vector may be considered to represent a vertical column of the geological formation at the point along the target well 102 with the values of the vector indicating the probability of particular offsets between the point and the geological feature of interest. Such vectors may be generated for multiple points along the target well 120 and combined into a multi-dimensional matrix (referred to herein as an "error matrix") describing such probabilities for a full well vertical section, such as the well vertical section 200 of FIG. 2B. As described below in more detail, the error matrix may subsequently be, among other things, converted into one or more visualizations and presented through a user interface to a user for further analysis and/or used as a data set for automatically controlling drilling operations.

The step of generating the error matrix (or a similar data set) is included in the method 600 of FIG. 6 as operation 608. Operation 608 may be performed according to any of the approaches described in the present disclosure, but, in general, involves generating the error matrix based, at least in part, on the reference data, the drilling data, and the identified anchor point or some other mechanism by which the reference data is linked to the drilling data.

Generation and presentation of a visualization based on the error matrix is included in the method 600 as operation 610. As discussed herein, the visualization generally includes multiple portions corresponding to the entries of the error matrix, with one or more visual properties of each portion being varied according to the value of its respective error matrix entry. For example, in one implementation, each portion may be assigned a color based on its respective error matrix value such that the visualization is in the form of a heat or color map including a series of colored bands, with each band having similar error values.

The specific colors used in the visualization may vary and, in certain applications, may be user customizable; however, in general, a spectrum of colors is correlated to a particular error value or range of error values (which may be absolute error values or relative error values). So, for example, in one implementation white may indicate no or little error, shades of yellow may indicate relatively low error, shades of red may indicate relatively high error, and shades of orange may indicate intermediate error values. In certain implementations, each of negative and positive error values correspond to different colors (e.g., an error of −0.5 would be assigned a different color than an error of 0.5). Alternatively, colors may be assigned based on absolute error values (e.g., an error of −0.5 would be assigned the same color as an error of 0.5). Various thresholds may also be applied such that any error values above a certain value are not displayed or otherwise blocked out to clearly delineate such locations in the visualization from other locations where the error value is below the threshold and, therefore, more likely indicative of a particular feature. It should be appreciated that color is provided as merely an example visual parameter and that other parameters (e.g., saturation, intensity, etc.) may be used instead of color. In such cases, a similar approach may be taken in which different levels or ranges of the parameter are assigned to corresponding error values or ranges, respectively.

At operation 612, a drilling parameter is modified based on the error matrix and/or input provided through the geosteering interface. For example, in certain implementations, the geosteering interface may enable a user to provide one or more commands or inputs to modify one or more drilling parameters in response to being presented with the visualization in operation 610. In other implementations, systems in accordance with the present disclosure may automatically analyze the error matrix or visualization to identify geological features or other trends in the error matrix and, based on such trends, automatically modify one or more drilling parameters. It should be appreciated that in systems in which drilling operations are automatically controlled based on the error matrix, the step of generating and displaying a visualization based on the error matrix (e.g., operation 610) may be omitted.

It should be appreciated that the term "error matrix" is used herein for convenience and should not be considered limiting to the type of analysis or computations used in correlating the drilling and reference data to identify potential locations for geological features or similar points of interest. Rather, the error matrix refers more broadly to a data set that is generated by performing one or more mathematical transformations or operations on the drilling and reference data with each entry of the data set indicating a probability that a geological feature of interest is located at a particular location within the geological formation.

Additional details and examples of the calculation of the error matrix are now provided with reference to the vertical well section 200 of FIG. 2B. As previously discussed in the context of FIG. 2B, an anchor point 206 may be identified that generally corresponds to the top 208 of the target zone 210. The anchor point 206 is generally identifiable in each of reference data, such as a type well log for the type well 110, and drilling data, such as a LWD log for the target well 102.

As the target well 102 is drilled, it may be desirable to determine the location of the top 208 of the target zone 210 at a particular distance (Vs') along the target well 102. In other words, an operator may want to ensure that the target well 102 is at a particular TVT offset relative to the top 208 of the target zone 210 at distance Vs'. Doing so allows the operator to determine whether the target well 102 is extending through the target zone 210 and, by examining data from adjacent points of the target well 102, the trend of the target well 102 relative to the target zone 210. Such information further enables the operator to control drilling operations to maintain the target well within a particular range of TVT offsets and, as a result, to ensure that the target well 102 remains within the target zone 210 for a substantial portion of its length.

In one example implementation of the present disclosure, errors (or similar values indicating a difference or deviation) between the reference data and drilling data is obtained for various points along the target well 102. For example, assuming Vs' is within a range of TVT offsets about the anchor point 206, error estimates along a vertical line extending from Vs' may be calculated based on the referenced data. For purposes of this example, one such point may be indicated by the coordinates (Vs', TVT'), where Vs' is the lateral offset of the point of interest of the target well 102 and TVT' is a vertical offset relative to the anchor point 206.

In one example implementation, calculating the error values may include obtaining and comparing a first gamma ray response value of the drilling data (e.g., from a LWD log) obtained at Vs' and a second gamma ray response value of the reference data (e.g., from the type well log) obtained at the depth TVT'. For purposes of the following discussion, the first gamma ray response value is referred to as the LWD amplitude (aLWD) and the second gamma response value is referred to as the type well log amplitude (aType). In certain implementations, obtaining aType may include identifying the anchor point 206 in a type well log and identifying the gamma response value by measuring up the log (if TVT' is positive) or down the log (if TVT' is negative) by the value of TVT'.

After each of aLWD and aType is obtained, an error function may be applied to the values to generate the error value. More generally, an error (e) may be calculated using the equation:

$$e = F(a\text{LWD}, a\text{Type})$$

where F is a function that measures a distance in a solution space between the measured value aLWD and the estimated value aType. For example, in one implementation the function F may calculate the absolute difference between aLWD and aType (e.g., F=|aLWD—aType|).

The foregoing computation provides an error value for one specific location (i.e., (Vs', TVT')) within the geological formation 101. However, in implementations of the present disclosure, the computation may be performed for each point within a portion of a well vertical section to generate a matrix of error values corresponding to the portion of the well vertical section. For example, error values may be calculated for each point (Vs', TVT') in a region of the well vertical section 200 defined by the ranges Vs': [0, $Vs_{current}$] and TVT': [$-TVT_{max}$, $TVT_{max}$], where $Vs_{current}$ is the current lateral position of the drill bit and $TVT_{max}$ is a predetermined value defining a maximum vertical offset of interest relative to the anchor point 206. In certain implementations, the matrix may be normalized such that each value in the error matrix is between a value of 0 and 1 (or other predetermined range).

In certain cases, a single measured property of the formation may produce an error matrix that is insufficiently resolved so as to be an acceptable aid in interpreting the location of the top 208 of the target zone 210. For example, if the error matrix is based on gamma response only, the error matrix may include multiple depths for which the error values are relatively low such that it is difficult to reasonably determine which depth corresponds to the actual top 208 of the target zone 210. Accordingly, to increase distinctiveness and resolution, systems and methods according to this disclosure may consider multiple properties when generating the error matrix or may generate multiple error matrices, each error matrix corresponding to a distinct combination of one or more formation properties. For example, if the gamma response log alone is insufficient to identify the target zone, two error matrices may be generated, one based on gamma response data and a second based on resistivity data or some other property.

When multiple error matrices for different properties are generated, they may be subsequently combined. For example, a first error matrix corresponding to gamma response may be generated and mathematically combined with a second error matrix corresponding to resistivity. Example mathematical operations may include, without limitation, adding the error matrices or calculating a Euclidean distance representing a total combined error value for each entry in final matrix. Combining multiple matrices may also include, among other things, normalization (including normalization before or after combining the matrices) and applying different weights to each of the matrices being combined. As an alternative to generating and then combining multiple error matrices to generate a combined error matrix, an error matrix in accordance with the present disclosure may be generated in the first instance based on multiple measured properties. For example, the function F previously discussed in the context of generating error values may take as input drilling and reference data values for different rock properties.

In one aspect of the present disclosure, the error matrices generated as described above may be used to construct an image or similar visualization for presentation to an operator. Such visualizations may then be used by the operator to identify, among other things, likely locations of features within the geological formation 101. For example, a user interface may present an image or representation of the geological formation 101, similar to the well vertical section 200 of FIG. 2B. The user interface may then modify the appearance of the representation of the geological formation according to the values of one or more error matrices generated as described above. More specifically, the representation of the geological formation may be divided into a grid or similar portions (including individual pixels), each portion corresponding to a location in the well vertical section 200 and associated with one or more entries of the error matrix. Visual properties of each portion of the representation may then be varied by the user interface based on the values of the respective entries in the error matrix. For example, in one implementation, the color of the portion of the representation may vary based on the magnitude of the corresponding error value of the error matrix. The resulting representation would appear on the user interface as a color map with the probability of a geological feature being located at a portion of the well vertical section being indicated by the portion's color. In other implementations, one or more other visual properties may be varied including, without limitation, one or more of color value (i.e., lightness or darkness), saturation, contrast, brightness, fill pattern, opacity, and the like. In the context of geosteering, such a visualization may be considered a steering field useful in determining the particular location of geological features, the relative location of a well to such features, and, as a result, any course correction or similar steering operations that need to be applied to maintain a particular offset from the geological feature.

Figure 4A:
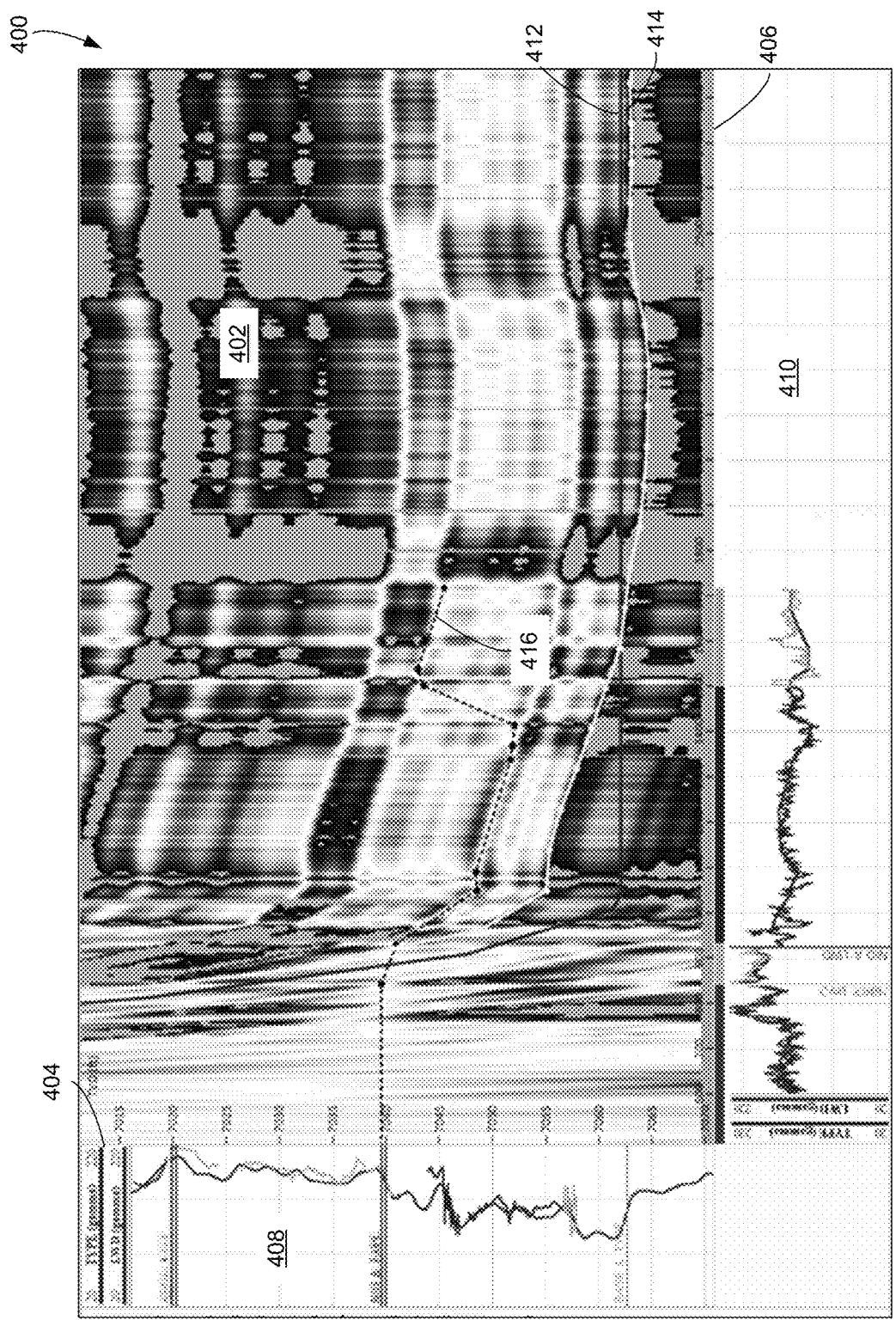
FIG. 4A-4C are illustrations of a user interface including a heat map and various features for indicating a geological feature.
Figure 4B:
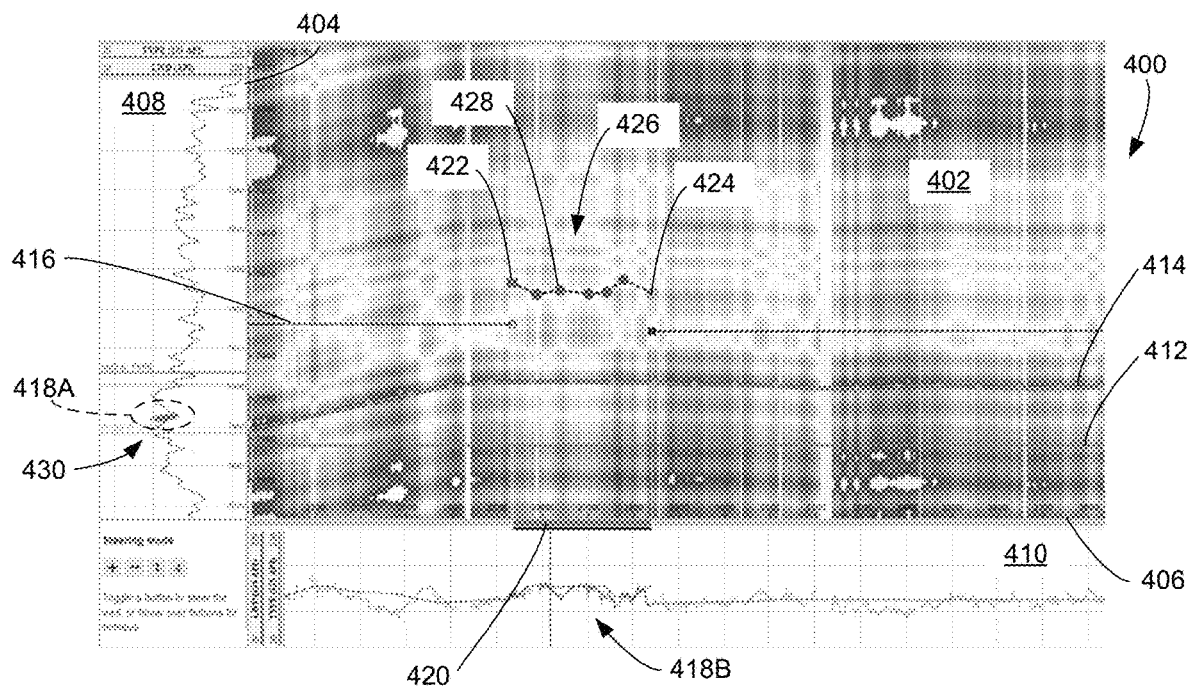
Figure 4C:
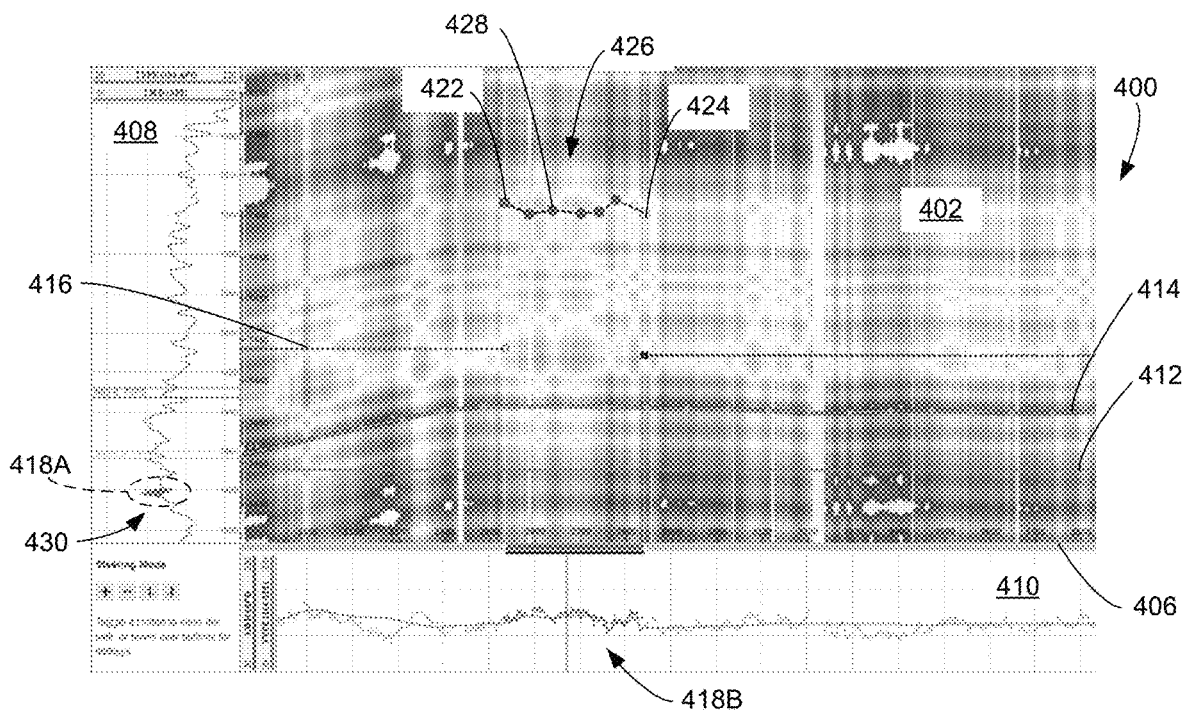

FIGS. 4A-4C are illustrations of a user interface 400 and heat map generated in accordance with aspects of the present disclosure, along with other features, for use in identifying features within a geological formation and directing geosteering functions. As shown in each of FIGS. 4A-4C, the user interface 400 includes a well vertical section visualization 402, with a vertical axis 404 indicating TVD depth and a horizontal axis 406 indicating lateral displacement (Vs). The user interface 400 may further include portions for illustrating log data. For example, the user interface 400 includes a first log window 408 for illustrating gamma response relative to vertical displacement for each of an LWD log and a type well log and a second log window 410 illustrating gamma responses relative to horizontal displacement for each of the LWD log and the type well log. Although illustrated as indicating TVD and Vs, the horizontal and vertical axes of the well vertical section 402 may be readily changed by the user to indicate other units or frames of reference. For example, the vertical axis may readily be switched to indicate depth based on TVD or TVT (i.e., depth relative to an anchor point). In another example, the horizontal axis may readily be switched to indicate measured depth (MD) rather than Vs. As shown in FIG. 4A, the visualization 402 further includes a target drill path 412 and an actual drill path 414, the latter of which may be plotted in the user interface 400 based on, among other things, real-time location data obtained from drilling instrumentation. The user interface 400 may be used for various purposes; however, in at least certain implementations of the present disclosure, the user interface 400 includes functionality to correlate LWD log data for a current/active wellbore with log data for a type well and to mark features, such as a top of a formation.

As illustrated in FIG. 4A, the visualization 402 may include a series of differently colored areas and/or bands. As previously discussed, the coloring of the areas/bands may be used to indicate the relative values of the error matrix for the well vertical section depicted by the visualization 402. For example, in certain implementations, the coloring of the visualization 402 may indicate the likelihood that a top of a target zone (such as the top 208 of the target zone 210 illustrated in FIG. 2B) is at a particular depth relative to the wellbore being drilled. In the specific example of FIG. 4A, depths having a lighter color or shade indicate a higher probability of the existence of the top of the target zone. The visualization 402 has the particular advantage of presenting the large amount of information contained in the error matrices in a manner that is intuitive for the user to interpret. Among other things, by illustrating the values of the error matrices as colored bands, the user is readily able to assess multiple possible locations of a geological feature within the formation to determine its most likely location.

As previously discussed, multiple error matrices may be generated and respective visualizations may be generated for each error matrix. In such cases, a user may select any of the multiple visualizations for display in the user interface. The user may also select or otherwise specify ways of combining multiple visualizations. Such combination may include a mathematical transformation applied to each of the multiple visualizations in order to generate a blended visualization. Combining visualizations may also include overlaying multiple visualizations. In such cases, the user may specify attributes (e.g., opacity) of individual layers such that certain portions of one or more of the visualizations may be visible in combination with the other visualizations.

In general, generation of the visualization 402 requires alignment between the LWD log data and the type well data. Although such data may be correlated based on an anchor point location common in each log, in at least some situations, further adjustment or alignment of the LWD log data and the type well data may be required. As noted above, the user interface 400 may include each of a first log window 408 and a second log window 410 that display gamma response data each of the LWD log and the type well log. To facilitate alignment of the log data, each of the first log window 408 and the second log window 410 may include functionality to selectively couple and decouple the LWD log data from the type well log data and to allow manipulation of each log with respect to each other. For example, when decoupled, a user may shift (e.g., vertically in the first log window 408) one of the graph of the LWD log data or the type well log data relative to the other. Such shifting may be used to align peaks, slopes, or other features of the LWD log data with the type well log data to achieve a better fit between the two data sets. In response to such shifting, each of the error matrix underlying the visualization 402 and the visualization 402 itself may be dynamically updated to reflect the modified correlation between the logs.

Through the user interface 400, the user may examine and analyze specific portions of the visualization 402. For example, the user interface 400 may include functionality enabling the user to pan, zoom, crop, or otherwise manipulate the visualization 402 to focus on particular portions of the visualization 402. The user interface 400 may also enable the user to dynamically modify the visualization 402 in various ways. For example, and without limitation, the user may customize the visual property to be varied based on the values of the error matrix (e.g., the user may select between color, color value (i.e., lightness or darkness), saturation, contrast, brightness, fill pattern) or may select between different display modes for a given visual property (e.g., for color, selecting between different color palettes). As another example, the user may be able specify the resolution/granularity of the visualization 402, such as by specifying the range of values for which each color (or other visual property) is applied. In yet another example, the user may be able to toggle the application of various mathematical operations to the underlying data of the visualization 402. For example, the user may be able to toggle between displaying unsigned (i.e., absolute) error or signed error.

In certain implementations, the user interface 400 allows a user to select points of the visualization to mark or otherwise identify features of interest. For example, the visualization 402 includes a top of target zone line 416 that may be generated in response to the user selecting multiple points of the visualization 402 that the user believes to be the most likely location of the top of the target zone based on the coloring of the visualization 402. As the drill bit advances, the user repeats this process to extend their interpretation of the top of the target zone along the new portion of the well bore. As illustrated, the line 416 may be continuous; however, in certain cases, the line 416 may be discontinuous, such as when the top of the target zone is subject to a sudden shift as may be caused by a fault or similar discontinuity in the formation. Such discontinuity is illustrated in each of FIGS. 4B and 4C.

The line 416 may be supplemented by a second line (not shown) offset from the line 416 to illustrate a thickness within the formation. For example, a user may know that a particular feature has a thickness of 40 feet and may configure the user interface 400 to display each of the line 416 indicating the top of the formation and a second line offset by 40 feet below the line 416.

As previously noted, the user interface may enable a user to shift the LWD log data relative to the type well log data to improve correlation between and alignment of the two data sets. In implementations of the present disclosure, a similar process may also be conducted on a more discrete level by segmenting the LWD log data into one or more "blocks", each of which may be independently manipulated to improve the fit between the LWD log data of the block and a portion of the type well data. Such manipulation may include, without limitation, shifting the block (e.g., to a different depth), scaling the block (e.g., by expanding or reducing the range of depth represented by the block), inverting or reversing the block, or any other similar manipulation of the block of LWD data.

Defining and manipulating blocks of the LWD log data may be used to account for variation that may exist between the type well log data and the LWD log data or that may be attributable to other aspects of how the log data is collected, compared, and visualized. For example, while the type well and target well may be disposed in the same general formation, variations in the formation between the location of the type well and the location of the target well may result in variance between the type well log data and LWD log data. Another source of variation may result from the three-dimensional target well being projected onto a two-dimensional plane for purposes of visualization and analysis. By allowing blocks of the LWD log data to be defined and manipulated, a user is able to fine tune the relationship between the LWD log data and the type well data, thereby improving the certainty with which geological features may be identified and corresponding geosteering decisions may be made.

An example application of a block and its manipulation is provided in FIGS. 4B and 4C, which were introduced previously and include substantially the same user interface elements as FIG. 4A. As an initial matter, blocks may be defined in various ways. For example, a user may select two locations in the first log window 408 and/or second log window 410 delineating the start and end locations of a given block. As another example, the user interface 400 may be configured to automatically generate blocks based on various criteria. For example, the user interface 400 may automatically generate blocks at specific intervals or in response to various changes or characteristics of the LWD data.

For simplicity and clarity, each of FIGS. 4B and 4C include a single block defined in the LWD data. When a block is defined, the user interface 400 may update each of the first log window 408 and/or second log window 410 to visually indicate the block. As indicated in FIGS. 4B and 4C, for example, each of blocks 418A and 418B are shown in the first log window 408 and second log window 410, respectively, as darkened/differently colored sections of the LWD log data. Although distinctly illustrated, the blocks 418A and 418B rely on the same underlying data and, as a result, are linked such that manipulating one of the blocks 418A, 418B results in corresponding changes to the other. Accordingly, for the remainder of this discussion, the blocks 418A, 418B are referred to collectively as the block 418.

In addition to or as an alternative to the portion of the LWD log corresponding to the block being shown in a different color, a colored line segment adjacent one of the first log window 408 and the second log window 410, such as the line segment 420 disposed above the second log window 410, may also be used to indicate a block. In other implementations, a block may be delineated within the first log window 408 or second log window 410 by horizontal or vertical lines, respectively; may be shown in the first log window 408 or second log window 410 as having a different background color than log segments; or may be indicated in any other suitable manner. The block may also be indicated in the visualization 402, such as by adding endpoints 422, 424 to a segment 426 of the top of target line 416 (or similar line indicating a feature of interest) corresponding to the block 418. As illustrated, the segment 426 may also include multiple points (such as point 428) disposed between the endpoints 422, 424. Such points may be provided by a user to further define the shape of the segment 426 between the endpoints 422, 424.

Once a block has been defined, the block may be manipulated in various ways to improve correlation between the LWD log data of the block and the type well log data. As illustrated in the transition between FIGS. 4B and 4C, for example, the block 418A has been shifted in the first log window 410 from a first location 430 in FIG. 4B to a second location 432 in FIG. 4C. Although such manipulation may be achieved in various ways, in at least one implementation a user may click and drag or otherwise select and move the block 418 in the log windows 408, 410 between locations. In other implementations, the block may be selected (e.g., by right-clicking the block) and the user may be presented with a list of options for manipulating the block 418. In yet another implementation, the block 418 may be manipulated by selecting and dragging (or otherwise moving) visual indicators corresponding to the block (e.g., lines in the first log window 408 and second log window indicating the start and end of the block 418).

Referring back to FIGS. 4B and 4C, in response to shifting the block 418, the location of the segment 426 corresponding to the block 418 is updated to reflect the new relationship between the LWD log data corresponding to the block 418 and the type well data. In the specific example of FIGS. 4B and 4C, shifting the block 418 to correspond to a portion of the type well data at a lower depth results in the segment 426 undergoing a similar shift to a shallower depth. In other instances in which the block 418 is manipulated in other ways, the segment 426 may respond in a different manner. For example, if the block 418 is scaled to extend over a larger depth (e.g., is expanded), the difference between the points of the segment 426 may be increased and the segment 426 may appear more jagged. If, on the other hand, the block 418 is reversed in the horizontal/lateral direction, the order of the points may be reversed.

In each of FIGS. 4A-4C, the target well 414 extends fully across the user interface and, as a result, so too does the visualization 402. In other words, both drilling and reference data is already available for the portion of the vertical well section illustrated in each figure. However, it should be appreciated that in at least certain implementations of the present disclosure, the visualization 402 may be updated as drilling data is obtained during a drilling operation. In such applications, as new drilling data is received from a drilling site, user interface may be updated to reflect the new drilling data. Such updates may include, among other things and without limitation, extending the actual drilling path 414, adding additional "strips" of the visualization 402 corresponding to the extended drilling path 414, updating each of the logs windows 408, 410 to include newly received LWD data, and the like. Accordingly, the user interface 400 may dynamically update the representation of the drilling operation in real- or near real-time.

In certain implementations, identifying the location of the feature of interest may be at least partially automated. In a first automation example, the user, having selected two or more points corresponding to likely locations of a geological feature, may direct the system to perform an auto-detection process for the region between the selected points. In response, the system may execute a detection algorithm that automatically identifies a path between the selected points along which the values of the underlying error matrix are minimized and are within a particular range of the selected points. In a second automation example, the user may select a single point and the system may automatically identify paths extending laterally from the selected point having a minimal error. In any such automated process, the user may specify a cutoff threshold that limits the number of points, lateral distance from the selected point(s), or similar parameters specifying the degree of automation to be applied.

Data generated or used in any automated process of the system may be stored and used as a training set for one or more machine learning algorithms of the system. For example, one or more of the error matrix, LWD log data, reference data, user-selected points, automatically identified points, or any other data (in whole or in part) used in generating or analyzing the visualization or underlying error matrix may be retained as training data. As a result, the automated aspects relying on such machine learning algorithms may be continually improved and refined by use of the system.

Systems according to the present disclosure may be configured to automatically respond to receiving new data from a LWD or similar tool of a drilling assembly. For example, in one implementation, systems in accordance with the present disclosure may be in communication with an LWD tool of a drill string being used to drill a target well or in communication with a data source configured to receive data from such a tool during drilling. In response to receiving new data from the LWD tool, the system may automatically update an error matrix for the collected data and any visualizations corresponding to the error matrix currently displayed or to be displayed on via a user interface. For example, if the system receives a new gamma response measurement at a new location along a wellbore, the system may automatically calculate the corresponding error values and insert a new column or similar entry into the error matrix corresponding to the new data. Once updated, the error matrix may then be used to refresh a visualization of the error matrix such that the user is presented with the new information in substantially real time. To the extent the system is configured to perform any automated detection (e.g., automatic detection of a geological feature based on identified points), the system may also execute a corresponding detection algorithm on the new data.

Systems in accordance with this disclosure may also be communicatively coupled to a drilling system such that the system can issue control signals or instructions for conducting drilling operations. In certain implementations, the system may automatically steer a drill bit based on the calculated error matrix and/or any feedback or points identified by a user of the system. For example, the system may automatically change or control a drilling trajectory based on a location of a top of a target zone as identified automatically by the system through analysis of the collected drilling, reference, or error data and/or as identified by a user through interaction with the user interface.

Figure 5B:
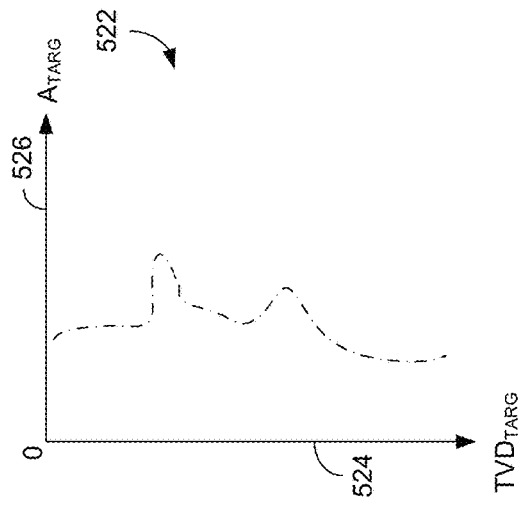
FIGS. 5A-5C are graphical illustrations of a well vertical section, a target well log, and a type well log during an initial setup phase of calculations for generating a heat map, such as the heat map of FIGS. 4A and 4B.
Figure 5C:
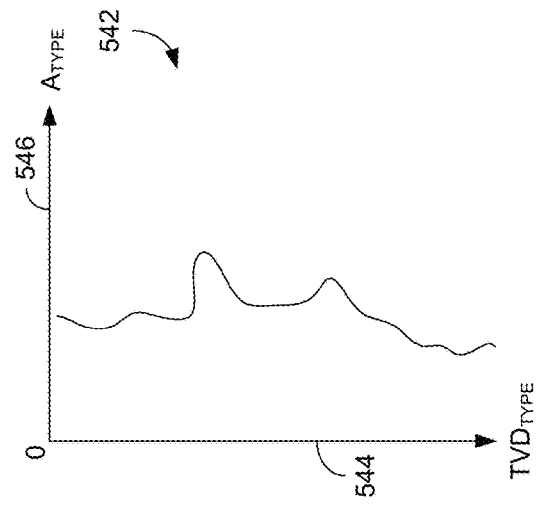
Figure 5A:
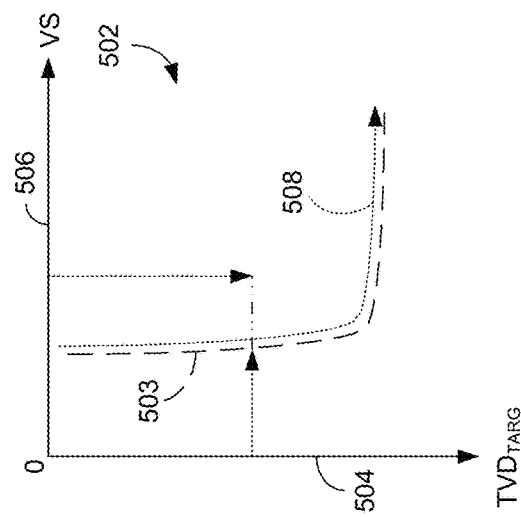
Figure 5E:
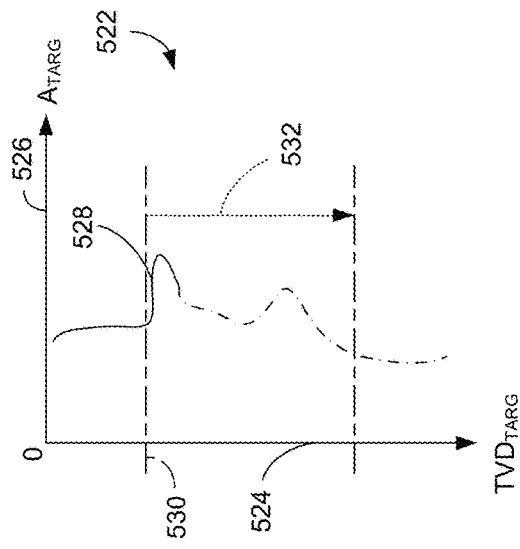
FIGS. 5D-5F are graphical illustrations of the same vertical well section, target well log, and type well log as FIGS. 5A-5C, respectively, during establishment of an anchor point and an initial prediction for a location of a geological feature.
Figure 5F:
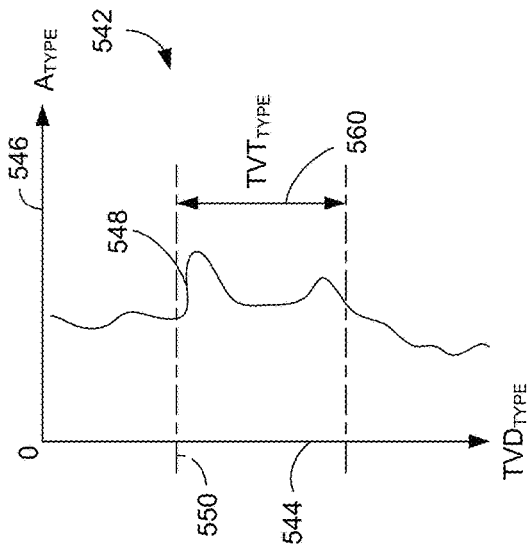
Figure 5D:
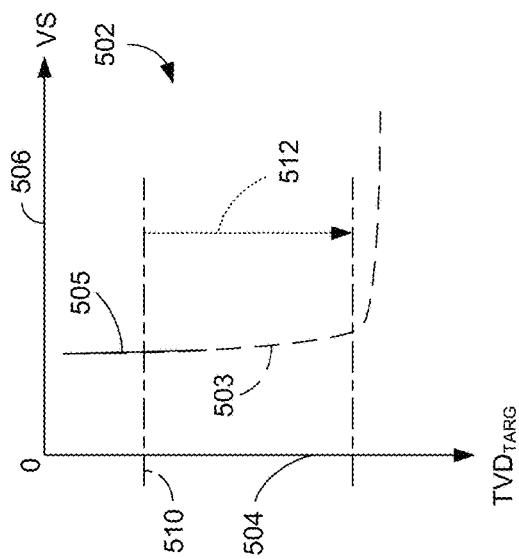
Figure 5H:
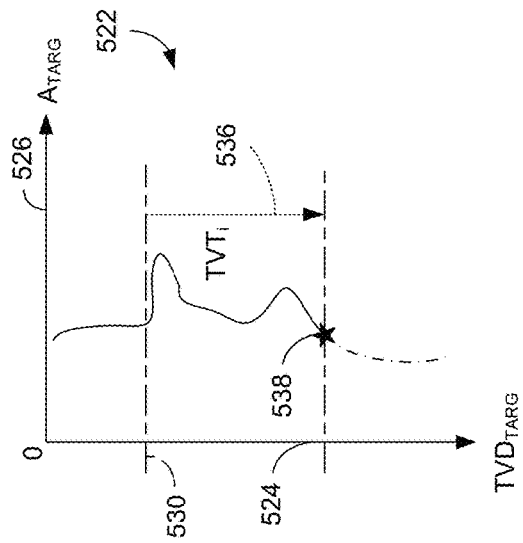
FIGS. 5G-5I are graphical illustrations of the same vertical well section, target well log, and type well log as 5A-5C, respectively, illustrating calculation of an error value for use in generating a heat map.
Figure 5I:
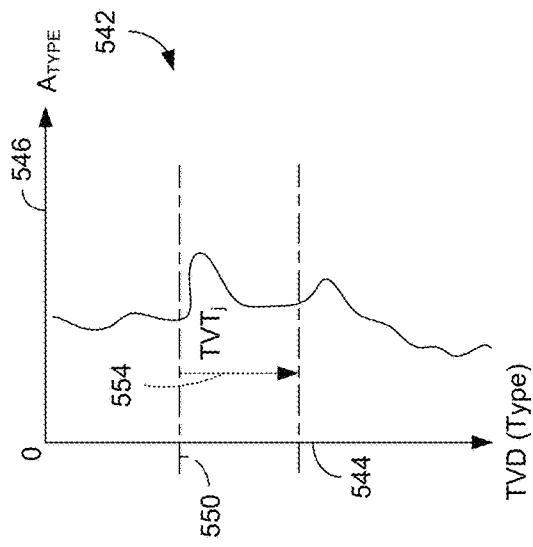
Figure 5G:
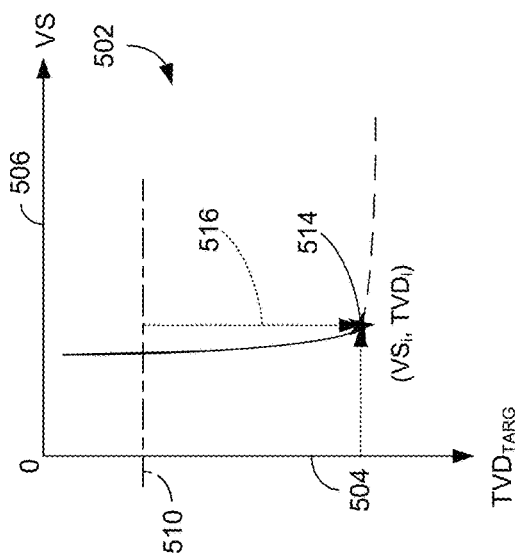

FIGS. 5A-5I are graphical illustrations depicting steps of an alternative example approach to calculating error values for inclusion in the error matrix. More specifically, FIGS. 5A-5C are graphical illustrations of a well vertical section, a target well log, and a type well log during an initial setup phase of the calculation, respectively. FIGS. 5D-5F are graphical illustrations of the same vertical well section, target well log, and type well log during establishment of an anchor point and an initial prediction for a location of a geological feature. Finally, FIGS. 5G-5I are graphical illustrations of the same vertical well section, target well log, and type well log illustrating actual calculation of an error value.

Referring first to FIG. 5A, a well vertical section 502 is illustrated including a target well path 503. The well vertical section 502 is illustrated with a vertical axis 504 indicating TVD relative to the top of the target well ($TVD_{TARG}$) and a horizontal axis 506 indicating lateral displacement (VS). FIG. 5B is a target well log 522 for the target well with a vertical axis 524 indicating $TVD_{TARG}$ and a horizontal axis 526 indicating an amplitude ($A_{TARG}$) of a parameter of interest obtained during drilling from a LWD assembly. For example and without limitation, the amplitude may correspond to a gamma ray response value measured at various locations along the target well during drilling. The values illustrated in FIG. 5B correspond to later obtained data and, as a result, are shown in dot-dash line. FIG. 5C is a type well log 542 for a type well (or similar reference well) with a vertical axis 544 indicating TVD relative to the top of the type well ($TVD_{TYPE}$) and a horizontal axis 546 indicating an amplitude of the same property as included in the well log 522 ($A_{TYPE}$). FIGS. 5D-5F and 5G-5I similarly illustrate the vertical well section 502, target well log 522 and type well log 542, respectively, in different states as described below in further detail.

Referring to FIG. 5A, the vertical well section 502 represents a two-dimensional plane defined in the (VS, TVD) space onto which points associated with the target well may be projected. In certain example implementations, the vertical well section 502 may correspond to a plane along a predetermined azimuth, such as the azimuth 108 illustrated in FIG. 2A. During drilling, the position of the drill bit relative to the wellhead in three-dimensions is generally known or readily obtainable using various sensors and tools such that, given a known azimuth, the position of the drill bit may be projected onto the two-dimensional plane of the vertical well section 502. Because each point along the well is also associated with a point measured in terms of MD, the location of the drill bit at any given point can generally be provided in three-dimensions relative to the wellhead, in the (VS, TVD) reference frame of the vertical well-section 502, or along MD. In other words, each point along MD is associated with a corresponding point in the (VS, TVD) frame of reference. Because of the relationship between the different frames of reference, the target well log 522 may be plotted in any of MD, TVD, or VS despite it being illustrated in FIG. 5B as $A_{TARG}$ against $TVD_{TARG}$. Nevertheless, $TVD_{TARG}$ is used herein for the type well log 522 for clarity.

Referring now to FIGS. 5D-5F, the target well 505 (shown in FIG. 5D) may be drilled down into the subterranean formation along the target well path 503. The actual depth to which the target well 505 may be drilled during this step may vary, however, in certain cases, the depth may correspond to an approximate depth of a geological feature of interest, such as a top of a target zone within the subterranean formation, that is visible in both the target well log 522 and the type well log 542. For example, the target well log 522 indicates a first increase 528 in amplitude just above the current drill position. A second increase 548 also appears in the type well log 542 and, as a result, the location of the depth of the first increase 528 and the second increase 548 may be considered to be at the same or sufficiently the same depth. A common anchor depth (indicated by anchor depth lines 510, 530, 550) may therefore be identified for each of the well vertical section 502 and the well logs 522, 542.

Referring to FIG. 5F, the type well curve also includes a known depth of the geological feature of interest (e.g., the top of the target zone). A true vertical thickness ($TVT_{TYPE}$) (indicated as by arrow 560) based on the type well log 542 may therefore be identified for the target zone relative to the anchor point line 550. In certain implementations, the value of $TVT_{TYPE}$ obtained from the type well log 542 may be used to identify a predicted location of the top of the target zone in the target well log 522 (identified by arrow 532) even though the target well has not yet been drilled to the corresponding depth. $TVT_{TYPE}$ is further illustrated in the well vertical section 502 of FIG. 5D by arrow 512.

Referring now to FIGS. 5G-5I, a point along the target well at ($VS_i$, $TVD_i$) (indicated in FIG. 5G as star 514) may be chosen and the corresponding depth of the point relative to the anchor line 510 ($TVT_i$, indicated as arrows 516 and 536) may be readily calculated as $TVT_i=TVD_i-TVD_{ANCHOR}$, where $TVD_{ANCHOR}$ is the TVD of the anchor line 530 for the target well. The corresponding amplitude value in the target well log 522 ($A_i$) for the point ($VS_i$, $TVD_i$) may then be read from the target well log 522, as indicated by star 538.

The value A may then be tested against one or more amplitude values at different TVT offsets indicated in the type well log 542. For example, for each of a range of TVT offsets, a mathematical function may be used to calculate an error or similar score for A and a second value $A_j$, where $A_j$ is the amplitude value of the type well log 542 at a given TVT offset ($TVT_j$, indicated by arrow 554) in the range. Various mathematical operations may be used to calculate the error; however, in one example the error may be the absolute difference between $A_i$ and $A_j$.

In one example, suppose the offset $TVT_i$ were used to look up $A_j$ from the type well log 542 (i.e., $TVT_j=TVT_i$). If the subterranean formation had not significantly deviated from horizontal between the lateral position associated with the anchor point and $VS_i$, then the difference between $A_i$ and $A_j$ should be relatively minimal. If, on the other hand, the formation deviated or changed in the vertical direction in some way, a difference between $A_i$ and $A_j$ would be observed. For example, if the formation sloped upward such that the difference between the top of the formation at the anchor point and the top of the formation at $VS_i$ was 15 feet, $A_i$ would likely correspond to a gamma ray response value for a location $TVT_i$+15 feet below the top of the formation at the lateral position of the anchor point. $A_j$, however, would still be the gamma ray response value at $TVT_i$ below the top of the target zone at the lateral position of the anchor point.

In light of the foregoing, the error calculated from $A_i$ and $A_j$ may generally be thought of as the likelihood that the top of the formation (or other geological feature of interest) at the lateral point $VS_i$ is located at the offset ($TVT_j$) used to obtain $A_j$. Accordingly, by calculating the error for each of a range of $TVT_j$ values, a set of error values for $VS_i$ may be obtained that generally describe such likelihoods for a vertical column of the formation. Such vertical columns for a range of VS locations may be combined to form a two-dimensional matrix of error values that may then be used to, among other things, provide a color map, heat map, or similar visualization for a user interface or monitor and control drilling operations.

To further illustrate the concepts discussed above, FIG. 5J is a graph 562 illustrating error versus TVT for lateral location $VS_i$ (as indicated in FIG. 5G). As a result, the graph 562 may be construed as illustrating the values contained in a vertical column of the error matrix where error is calculated as the absolute difference between the measured value at lateral position $VS_i$ (i.e., $A_i$ in the previous discussion) and the type well value measured at various TVT depths.

Figure 5J:
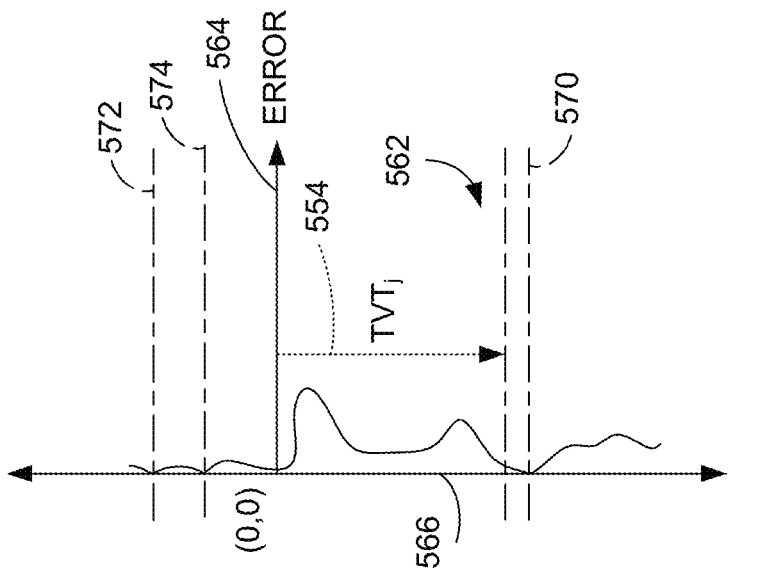
FIG. 5J is a graph illustrating the relationship between error and lateral location as discussed in the context of FIGS. 5G-5I.

The graph 562 includes a vertical axis 566 indicating TVT (e.g., such that 0 on the vertical axis 566 corresponds to the TVT depth of the anchor point as indicated in FIGS. 5G-5I as lines 510, 530, and 550, respectively) and a horizontal axis 564 indicating error. As illustrated in FIG. 5J, the error at depth $TVT_j$ is non-zero, implying that the measured value $A_i$ obtained during drilling deviates from the expected value of $A_i$ at depth $TVT_j$ according to the type well data. The graph 562 further indicates that it is more likely that the actual TVT depth at which $A_i$ was measured was at depths at which the error value is zero, as indicated by lines 570-574. However, it is also less likely that the actual TVT depth at which $A_i$ was measured was between the depth of the anchor point and the depth of $TVT_j$, as evidenced by the higher error value in that range.

As noted, the data underlying the graph 562 may generally correspond to a vertical column at lateral position $VS_i$. Accordingly, to the extent multiple measurements are obtained at various distances along VS, each such location along VS may be represented by a respective set of error values such that, when combined, a two-dimensional map/matrix of the error values results. Such error values may be converted subsequently to corresponding color values (or other values associated with a visual property) when illustrating a vertical well section, such as the vertical well section visualization 402 of FIG. 4A. For example, as illustrated in FIG. 4A, lighter colors indicate depths having a relatively low error while darker colors indicate depths having a relatively higher error. In other implementations, the error values may be used as an input to an automated system that identifies highly likely paths through a subterranean formation based on the error value matrix and, in certain implementations, may also automatically adjust drilling parameters to maintain a drill bit along such paths.

Figure 7:
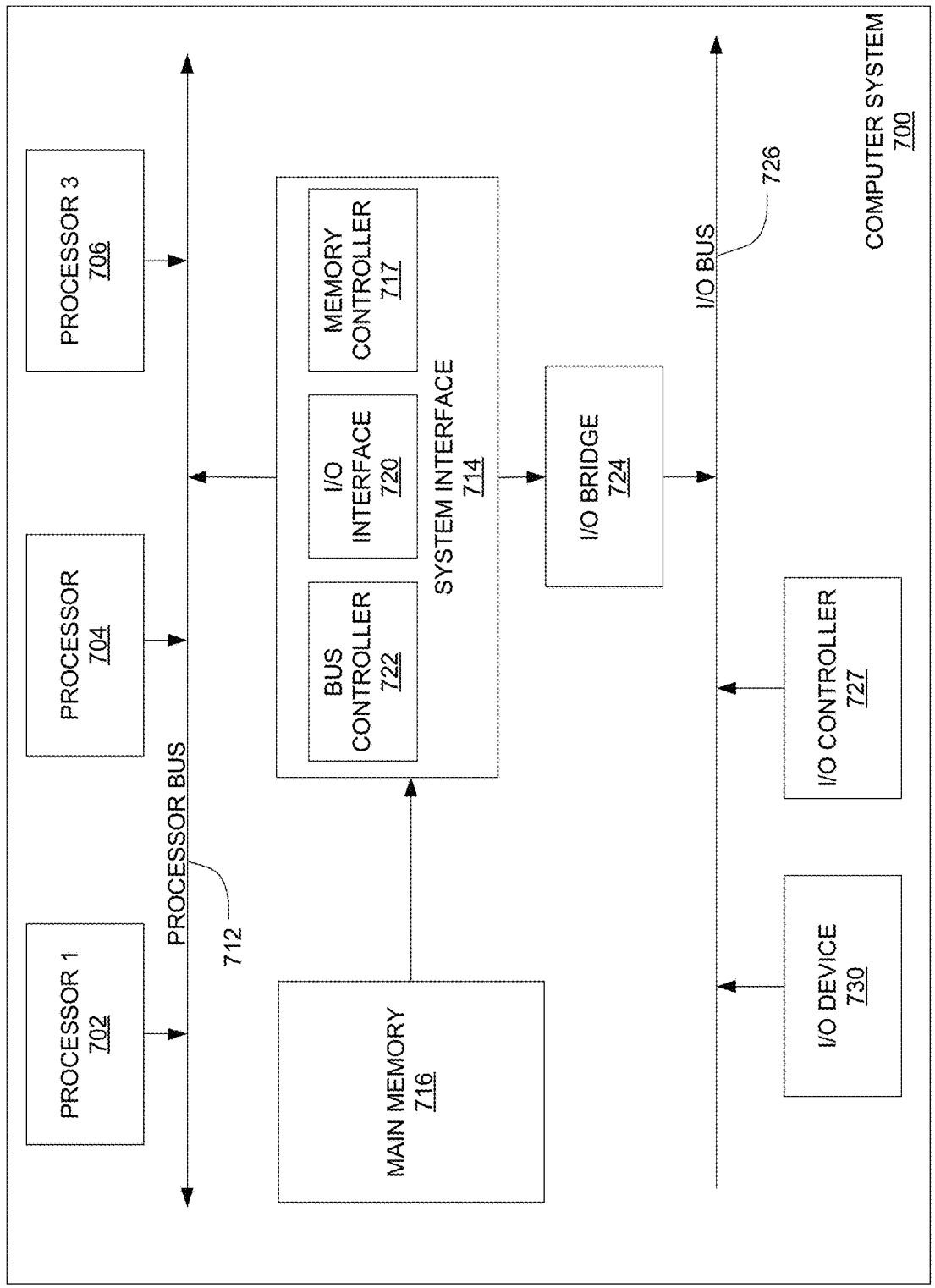
FIG. 7 is a block diagram illustrating an example computing system that may be used in implementations of the present disclosure.

FIG. 7 is a block diagram illustrating an example of a computing device or computer system 700 which may be used in implementing the embodiments of the network disclosed above. In particular, the computing device of FIG. 7 is one embodiment of the server or other networking component that performs one of more of the operations described above. The computer system (system) includes one or more processors 702-706. Processors 702-706 may include one or more internal levels of cache (not shown) and a bus controller or bus interface unit to direct interaction with the processor bus 712. Processor bus 712, also known as the host bus or the front side bus, may be used to couple the processors 702-706 with the system interface 714. System interface 714 may be connected to the processor bus 712 to interface other components of the system 700 with the processor bus 712. For example, system interface 714 may include a memory controller 718 for interfacing a main memory 716 with the processor bus 712. The main memory 716 typically includes one or more memory cards and a control circuit (not shown). System interface 714 may also include an input/output (I/O) interface 720 to interface one or more I/O bridges or I/O devices with the processor bus 712. One or more I/O controllers and/or I/O devices may be connected with the I/O bus 726, such as I/O controller 728 and I/O device 730, as illustrated.

I/O device 730 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706. The system set forth in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in main memory 716. These instructions may be read into main memory 716 from another machine-readable medium, such as a storage device. Execution of the sequences of instructions contained in main memory 716 may cause processors 702-706 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 716. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method of conducting drilling operations comprising:
   generating a visualization at a computing device of a drilling management system, wherein the visualization includes a vertical section of a geological formation and wherein generating the visualization includes:
   correlating drilling data of a target well within the geological formation with reference data for the geological formation about a reference point;
   calculating a probability that a target well location of the target well is at an offset relative to the reference point; and generating a visual indicator for the offset, wherein a visual property of the visual indicator is based on the probability that the target well location is at the offset.

2. The method of claim 1 further comprising receiving the drilling data from a logging while drilling (LWD) assembly of a drill string.

3. The method of claim 1, wherein the reference data includes well log data from a previously drilled well.

4. The method of claim 1, further comprising:
generating a data set at the computing device for generating the visualization from the reference data and the drilling data, wherein:
the reference data includes a reference data value for a formation property at the offset;
the drilling data includes a drilling data value for the formation property at the target well location; and
the data set includes a data set value representing a probability that the target well location is located at the offset, wherein the data set value is based on the drilling data value and the reference data value.

5. The method of claim 4, further comprising transmitting the visualization to a client computing device in communication with the drilling management system, wherein, in response to receiving the visualization, the client computing device displays the visualization via a user interface of the client computing device.

6. The method of claim 5, further comprising:
receiving a first selection of a first location in the visualization through the user interface, wherein the first location corresponds to a first target well location and a first offset;
receiving a second selection of a second location in the visualization through the user interface, wherein the second location corresponds to a second target well location and a second offset; and
automatically identifying an intermediate location between the first location and the second location, wherein the intermediate location corresponds to a third target well location and a third offset, wherein the intermediate location is within a predetermined range of the first location and the second location, and wherein the intermediate location is such that a probability that the third target well location is located at the third offset is a maximum.

7. The method of claim 5, further comprising:
receiving a selection of a first location in the visualization through the user interface, wherein the first location corresponds to a first target well location and a first offset; and
automatically identifying a second location, wherein the second location corresponds to a second target well location and a second offset, wherein the second location is within a predetermined range of the first location, and wherein the second location is such that a probability that the second target well location is located at the second offset is a maximum.

8. The method of claim 4, wherein the formation property includes gamma ray response, resistivity, neutron porosity, density, sonic response, pressure, temperature, or water content.

9. The method of claim 4, wherein the formation property is a first formation property, wherein the reference data includes a second reference data value for a second formation property at the offset, and the drilling data includes a second drilling data value for the second formation property at the target well location.

10. The method of claim 9, wherein the data set value is further based on the second reference data value and the second drilling data value.

11. The method of claim 4, wherein the data set is a first data set based on a first formation property and the visual property is a first visual property, the method further comprising:
generating a second data set from the reference data and the drilling data, wherein the second data set includes a second data set value representing a second probability that the target well location is located at the offset, wherein the second data set value is based on the drilling data and the reference data at the offset, and wherein the second data set is based on a second formation property; and
generating a second visual indicator for the offset, wherein a second visual property of the second visual indicator is based on the second probability that the target well location is at the offset.

12. The method of claim 1, wherein the visual property is color such that the color of the visual indicator is varied based on the probability.

13. The method of claim 4, further comprising providing the data set as a training set for a machine learning algorithm, the machine learning algorithm adapted to identify, based at least in part on the data set, a likeliest location of a geological feature within the geological formation relative to the reference point.

14. The method of claim 4, further comprising:
defining a block of the drilling data, the block of the drilling data being a contiguous portion of the drilling data;
linking a block visual indicator of the visualization to the block; and
in response to a user manipulating the block, automatically modifying the block visual indicator.

15. The method of claim 14, wherein automatically modifying of the block visual indicator is in response to at least one of the user shifting a location of the block relative to other drilling data, scaling drilling data of the block, or inverting drilling data of the block.

16. A method for geosteering during a drilling operation, the method comprising:
generating a data set at a computing device of a drilling management system, wherein generating the data set includes:
correlating drilling data of a target well within a geological formation with reference data for the geological formation about a reference point; and
calculating a probability that that a target well location along the target well is located at an offset relative to the reference point; and
automatically controlling a drilling operation parameter using the drilling management system to maintain a drill bit at a target offset relative to the reference point based on the data set.

17. The method of claim 16, wherein:
the reference data includes a reference data value for a formation property at the offset;
the drilling data includes a drilling data value for the formation property the target well location; and
the data set includes a data set value representing a probability that the target well location is located at the offset, wherein the data set value is based on the drilling data value and the reference data value.

18. The method of claim 16, wherein the drilling operation parameter includes a drilling direction, a weight on bit, or a rate of penetration.

19. The method of claim 16, wherein the reference data includes well log data from a previously drilled well and the method further comprises receiving the drilling data from a logging while drilling (LWD) assembly of a drill string.

20. A system for facilitating geosteering during a drilling operation, the system comprising:
a computing system comprising one or more processors and memory, the memory including instructions that, when executed by the one or more processors, cause the one or more processors to:
generate a visualization at a computing device of a drilling management system, wherein the visualization includes a vertical section of a geological formation and wherein, to generate the visualization, the instructions cause the one or more processor to:
correlate drilling data of a target well within the geological formation with reference data for the geological formation about a reference point;
calculate a probability that a target well location of the target well is at an offset relative to the reference point; and
generate a visual indicator for the offset, wherein a visual property of the visual indicator is based on the probability that the target well location is at the offset.

21. The system of claim 20, wherein:
the reference data includes a reference data value for a formation property at the offset, the drilling data includes a drilling data value for the formation property at the target well location; and
the instructions further cause the one or more processors to:
generate a data set for generating the visualization from the reference data and the drilling data, the data set including a data set value representing a probability that the target well location is located at the offset based on the drilling data value and the reference data value.

22. The system of claim 20, wherein the instructions cause the one or more processors to obtain the drilling data by receiving the drilling data from a remote wellsite data collection system in communication with the computing system, wherein the wellsite data collection system includes a logging while drilling (LWD) assembly of a drill string, and wherein the drilling data corresponding to LWD data collected by the LWD assembly during drilling of the target well.

23. The system of claim 20, wherein the memory further includes instructions that, when executed by the one or more processors, cause the one or more processors to transmit the visualization to a client device for display on a web browser of the client device.

24. The system of claim 20, wherein the reference data includes well log data from a previously drilled well and the memory further includes instructions that, when executed by the one or more processors, cause the one or more processors to retrieve the reference data from a data source including well log data for previously drilled wells.

* * * * *